(12) United States Patent
Choi

(10) Patent No.: US 11,108,418 B2
(45) Date of Patent: Aug. 31, 2021

(54) ELECTRONIC DEVICE FOR PERFORMING CARRIER AGGREGATION USING PLURALITY OF CARRIER FREQUENCIES VIA SWITCH AND OPERATING METHOD THEREOF

(71) Applicant: Samsung Electronics Co., Ltd., Gyeonggi-do (KR)

(72) Inventor: Youngbaek Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 50 days.

(21) Appl. No.: 16/444,363

(22) Filed: Jun. 18, 2019

(65) Prior Publication Data

US 2019/0386688 A1    Dec. 19, 2019

(30) Foreign Application Priority Data

Jun. 18, 2018  (KR) .................. 10-2018-0069714

(51) Int. Cl.
*H04B 1/00* (2006.01)
*H04L 27/152* (2006.01)
*H04L 5/00* (2006.01)
*H04L 27/00* (2006.01)

(52) U.S. Cl.
CPC ......... *H04B 1/0064* (2013.01); *H04B 1/0067* (2013.01); *H04L 5/001* (2013.01); *H04L 27/0014* (2013.01); *H04L 27/152* (2013.01); *H04L 2027/0016* (2013.01)

(58) Field of Classification Search
CPC .... H04B 1/0064; H04B 1/0067; H04B 1/006; H04L 27/152; H04L 5/001; H04L 27/0014; H04L 2027/0016
See application file for complete search history.

(56) References Cited

U.S. PATENT DOCUMENTS

| 5,987,309 | A | * | 11/1999 | Adachi | H03D 7/161 |
| | | | | | 455/86 |
| 8,792,395 | B2 | | 7/2014 | Kwon et al. | |
| 8,892,057 | B2 | | 11/2014 | Khlat | |
| 2004/0121739 | A1 | * | 6/2004 | Suzuki | H04B 1/3833 |
| | | | | | 455/84 |
| 2012/0108185 | A1 | * | 5/2012 | Yen | H04B 1/0067 |
| | | | | | 455/90.2 |

(Continued)

FOREIGN PATENT DOCUMENTS

EP    3 264 614    1/2018

OTHER PUBLICATIONS

International Search Report dated Dec. 24, 2019 issued in counterpart application No. PCT/KR2019/007303, 8 pages.

(Continued)

*Primary Examiner* — Christopher M Brandt
(74) *Attorney, Agent, or Firm* — The Farrell Law Firm, P.C.

(57) ABSTRACT

An electronic device and method for supporting carrier aggregation are provided. An electronic device may include a communication circuit including a plurality of local oscillators; and a processor configured to determine an operation mode of at least one local oscillator among the plurality of oscillators based on at least one of a number of uplink carriers and a number of downlink carriers; and control the at least one local oscillator to operate based on the determined operation mode.

6 Claims, 17 Drawing Sheets

(56) References Cited

U.S. PATENT DOCUMENTS

| | | | |
|---|---|---|---|
| 2014/0072001 A1 | 3/2014 | Chang et al. | |
| 2014/0146761 A1 | 5/2014 | Li et al. | |
| 2015/0009873 A1* | 1/2015 | Liu | H04L 5/14 370/280 |
| 2015/0078497 A1 | 3/2015 | Zhang et al. | |
| 2015/0318975 A1 | 11/2015 | Lim et al. | |
| 2015/0333815 A1 | 11/2015 | Leung et al. | |
| 2015/0349907 A1 | 12/2015 | Narathong et al. | |
| 2017/0040947 A1 | 2/2017 | Chang et al. | |
| 2017/0048859 A1* | 2/2017 | Hayakawa | H03F 3/24 |
| 2018/0331716 A1* | 11/2018 | Zhang | H04B 1/00 |

OTHER PUBLICATIONS

European Search Report dated Apr. 8, 2021 issued in counterpart application No. 19821528.7-1216, 15 pages.
European Search Report dated Jul. 21, 2021 issued in counterpart application No. 19821528.7-1216, 15 pages.

* cited by examiner

ELECTRONIC DEVICE FOR PERFORMING CARRIER AGGREGATION USING PLURALITY OF CARRIER FREQUENCIES VIA SWITCH AND OPERATING METHOD THEREOF

CROSS-REFERENCE TO RELATED APPLICATION(S)

This application is based on and claims priority under 35 U.S.C. § 119 to Korean Patent Application No. 10-2018-0069714, filed on Jun. 18, 2018, in the Korean Intellectual Property Office, the entire disclosure of which is incorporated herein by reference.

BACKGROUND

1) Field

The present disclosure relates generally to an electronic device including a wireless communication circuit that performs carrier aggregation and an operating method thereof.

2) Description of Related Art

Carrier aggregation (CA) is a representative technique used in long-term evolution advanced (LTE-A) systems. CA refers to a method in which an electronic device uses a plurality of uplink carriers and/or a plurality of downlink carriers. For example, an electronic device supporting an LTE-A system may use up to five carriers for an uplink and/or a downlink in order to increase data transmission and reception efficiency. In CA, one carrier refers to a carrier frequency band having a 20 MHz bandwidth.

CA may be divided into three types depending on the position of carriers to be used. For example, CA may be divided into an intra-band contiguous CA type using continuous carriers in the same frequency band, an intra-band non-contiguous CA type using non-continuous carriers in the same frequency band, and an inter-band non-contiguous CA type using non-continuous carriers in different frequency bands.

SUMMARY

Electronic devices require a plurality of local oscillators in order to support CA using a plurality of carriers. For example, an electronic device needs to have N downlink local oscillators that supply a reference frequency to each of N carriers in order to support N downlink carriers. However, as the number of local oscillators included in an electronic device increases, the production costs and design complexity of the electronic device may increase.

Each country and/or each mobile network operator holds a different frequency band and has different requirements for carrier aggregation, and accordingly, electronic devices may be designed to satisfy various requirements of countries and mobile network operators. For example, electronic devices may be designed to support downlink 3CA and uplink 2CA in order to meet a downlink 3CA requirement of a first mobile network operator and downlink 2CA and uplink 2CA requirements of a second mobile network operator. In this case, an electronic device using only a communication network of the first mobile network operator does not use uplink CA, which may result in unnecessary costs and complexity for such a design.

However, when a radio frequency (RF) communication circuit is simplified in an electronic device for cost saving, the electronic device cannot support inter-band non-contiguous CA even though it includes a plurality of local oscillators. The present disclosure has been made to address at least the disadvantages described above and to provide at least the advantages described below.

Therefore, an aspect of present disclosure is to provide an electronic device including a wireless communication circuit that performs CA using a plurality of carrier frequencies using a switch in the electronic device and an operating method thereof.

In accordance with an aspect of the disclosure, an electronic device is provided, which includes a first oscillator; a second oscillator; a third oscillator; a communication circuit, which is electrically connected to the first oscillator, the second oscillator, and the third oscillator, and comprises a first signal terminal for communication using a first carrier frequency band of a first frequency band, a second signal terminal for communication using a second carrier frequency band of the first frequency band, a third signal terminal for communication using a third carrier frequency band of the first frequency band, a fourth signal terminal for communication using a first carrier frequency band of a second frequency band, a fifth signal terminal for communication using a second carrier frequency band of the second frequency band, and a sixth signal terminal for communication using a third carrier frequency band of the second frequency band; a switch including a first terminal, a second terminal electronically connected to the third signal terminal, and a third terminal electrically connected to the sixth terminal, wherein the switch selectively connects the first terminal to the second terminal or the third terminal; at least one antenna electrically connected to the first signal terminal, the second signal terminal, the fourth signal terminal, the fifth signal terminal, and the first terminal; and a control circuit, wherein, when communication with an external electronic device is to be performed using two or less carrier frequency bands in one of the first frequency band and the second frequency band, the control circuit is configured to communicate with the external electronic device using the first carrier frequency band or the second carrier frequency band of the one frequency band, and wherein, when communication with the external electronic device is to be performed using three or more carrier frequency bands in one of the first frequency band and the second frequency band, the control circuit is further configured to connect the first terminal to the second terminal or the third terminal using the switch, and communicate with the external electronic device using the first carrier frequency band, the second carrier frequency band, and the third carrier frequency band of the one frequency band.

In accordance with another aspect of the disclosure, an electronic device is provided, which includes a plurality of communication circuits configured to process carrier signals in different frequency bands; at least one switch connected to two communication circuits among the plurality of communication circuits and configured to provide a reception carrier signal to one of the two communication circuits based on a switching operation; and at least one processor configured to determine frequency bands of a plurality of carriers to be used for communication, control the switching operation based on the frequency bands of the plurality of carriers and a specified condition, and process signals of the plurality of carriers using at least one communication circuit among the plurality of communication circuits.

In accordance with another aspect of the disclosure, an electronic device is provided, which includes a communication circuit including a plurality of local oscillators; and a processor configured to determine an operation mode of at least one local oscillator among the plurality of oscillators based on at least one of a number of uplink carriers and a number of downlink carriers, and control the at least one local oscillator to operate based on the determined operation mode.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely examples. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Figure 1:
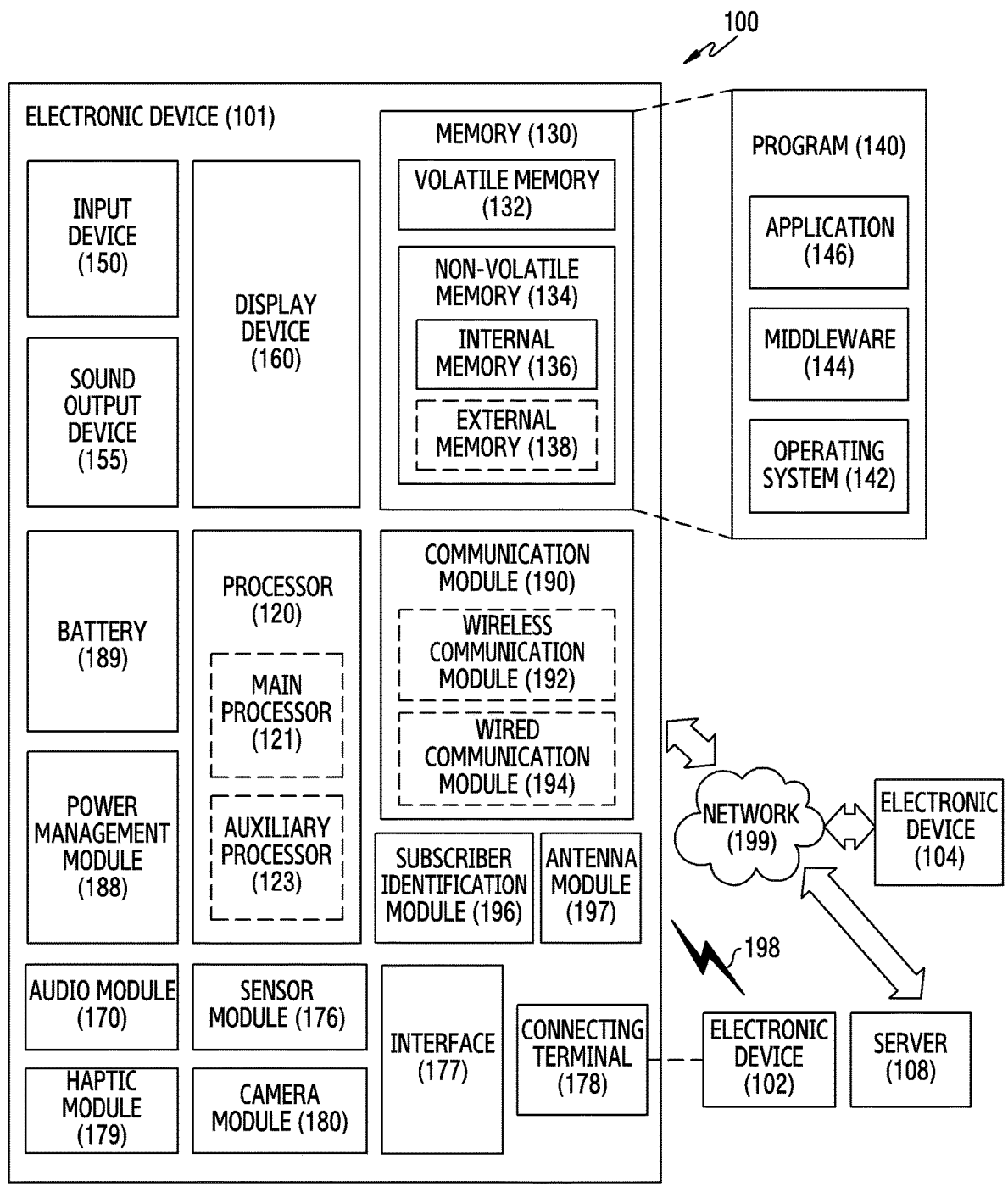
FIG. 1 illustrates an electronic device in a network environment according to an embodiment.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or an electronic device 104 and/or a server 108 via a second network 199 (e.g., a long-range wireless communication network). The electronic device 101 may communicate with the electronic device 104 via the server 108.

The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. Alternatively, at least one (e.g., the display device 160 or the camera module 180) of the components may be omitted from the electronic device 101, and/or one or more other components may be added in the electronic device 101.

Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134.

The processor 120 includes a main processor 121 (e.g., a central processing unit (CPU) and an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 includes the volatile memory 132 and the non-volatile memory 134.

The program 140 may be stored in the memory 130 as software, and includes, for example, an operating system (OS) 142, middleware 144, and an application 146.

The input device 150 may receive a command or data to be used by another component (e.g., the processor 120) of the electronic device 101, from the outside (e.g., a user) of the electronic device 101. The input device 150 may include a microphone, a mouse, a keyboard, or a digital pen (e.g., a stylus pen).

The sound output device 155 may output sound signals to the outside of the electronic device 101. The sound output device 155 may include a speaker and/or a receiver. The speaker may be used for general purposes, such as playing multimedia or playing record, and the receiver may be used for an incoming call. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or Infrared Data Association (IrDA)), or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192), from the plurality of antennas. The signal or the power may then be transmitted or received between the communication module 190 and the external electronic device via the selected at least one antenna. Another component (e.g., a radio frequency integrated circuit (RFIC)), other than the radiating element, may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
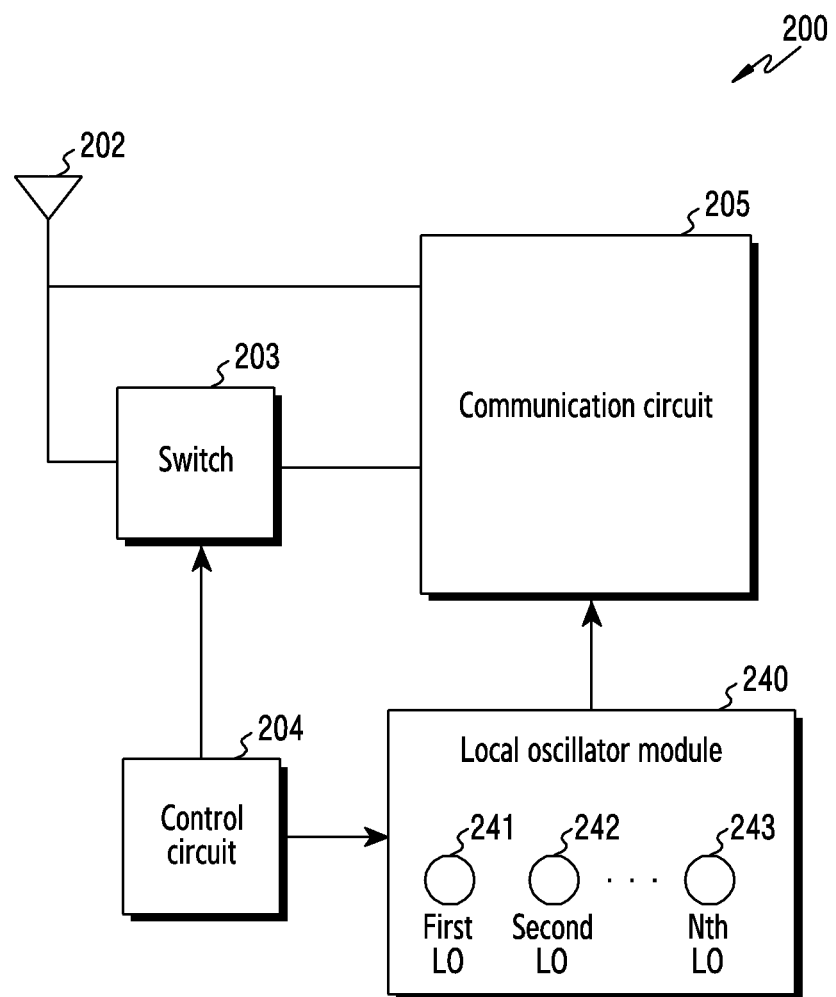
FIG. 2A illustrates an electronic device processing a carrier signal according to an embodiment.

FIG. 2A illustrates an electronic device processing a carrier signal according to an embodiment. The electronic device of FIG. 2A may be the electronic device 101 of FIG. 1.

Referring to FIG. 2A, the electronic device 200 includes an antenna 202, a control circuit 204, a switch 203, a communication circuit 205, and a local oscillator (LO) module 240. Alternatively, the electronic device 200 may include at least one other component.

The antenna 202 (e.g., the antenna module 197 of FIG. 1) may be electrically connected to the switch 203 and the communication circuit 205. The antenna 202 may be electrically connected to at least one input port (or input terminal) of the switch 203 and a plurality of input ports (signal terminals) included in the communication circuit 205. For example, the antenna 202 may be electrically connected to a first input port configured for communication using a first carrier frequency band included in a first frequency band, a second input port configured for communication using a second carrier frequency band included in the first frequency band, a fourth input port configured for communication using a first carrier frequency band included in a second frequency band, and a fifth input port configured for communication using a second carrier frequency band included in the second frequency band among the input ports included in the communication circuit 205. This connection between the antenna 202 and the communication circuit 205 is provided for illustrative purposes, and various embodiments are not limited thereto.

The switch 203 is disposed between the antenna 202 (or a duplexer connected to the antenna 202) and the communication circuit 205 and may deliver a signal of at least one downlink carrier received from the antenna 202 to the communication circuit 205. The switch 203 may be an SPDT switch or a DPDT switch. The switch 203 may receive a signal of a downlink carrier corresponding to at least one of a primary component carriers (PCC) or secondary component carriers (SCCs) through the antenna 202, and may provide the received signal to any one input port included in the communication circuit 205 by performing a switching operation based on a control signal provided from the control circuit 204. For example, output ports of the switch 203 may be electrically connected to a third input port configured for communication using a third carrier frequency band included in the first frequency band and a sixth input port configured for communication using a third carrier frequency band included in the second frequency band among the input ports included in the communication circuit 205. The switch 203 may provide the received signal to either the third input port of the communication circuit 205 or the sixth input port of the communication circuit 205 under the control of the control circuit 204. This connection between the switch 203 and the communication circuit 205 is provided for illustrative purposes, and various embodiments are not limited thereto.

The communication circuit 205 may receive a downlink carrier signal through the antenna 202 and/or the switch 203, may perform low-noise amplification of the received downlink carrier signal, and may downconvert the signal. The communication circuit 205 may include a plurality of input ports configured for communication using carrier frequency bands included in different frequency bands. For example, the communication circuit 205 may include the first input port configured for communication using the first carrier frequency band included in a first frequency band, the second input port configured for communication using the second carrier frequency band included in the first frequency band, the third input port configured for communication using the third carrier frequency band included in the first frequency band, the fourth input port configured for communication using the first carrier frequency band included in the second frequency band, the fifth input port configured for communication using the second carrier frequency band included in the second frequency band, and the sixth input port configured for communication using the third carrier frequency band included in the second frequency band. These input ports are provided for illustrative purposes, and various embodiments are not limited thereto. For example, the communication circuit 205 may further include a plurality of input ports configured for communication using a carrier frequency band corresponding to a third frequency band other than the first frequency band and the second frequency band.

The first frequency band may be about 700 MHz to 1000 MHz, the second frequency band may be about 1700 MHz to 2200 MHz, and the third frequency band may be about 2300 MHz to 2700 MHz. These frequency bands are provided for illustrative purposes, and various embodiments are not limited thereto. For example, the first, second, and third frequency bands may be changed by an operator and/or a designer.

The communication circuit 205 may receive a signal of the third carrier frequency band corresponding to the first frequency band through the third input port or the sixth input port according to the switching operation of the switch 203. The communication circuit 205 may receive a signal of the third carrier frequency band corresponding to the second frequency band through the third input port or the sixth input port according to the switching operation of the switch 203. The communication circuit 205 may include a plurality of low-noise amplifiers and a plurality of downconversion mixers and may perform low-noise amplification and downconversion of a downlink carrier signal inputted through each input port.

The local oscillator module 240 includes a plurality of local oscillators (first to Nth LOs) 241, 242, and 243. Each of the plurality of local oscillators 241, 242, and 243 may provide a reference frequency signal to the communication circuit 205 under the control of the control circuit 204. At least one of the plurality of local oscillators 241, 242, and 243 operates in a receive mode under the control of the control circuit 204, and the at least one local oscillator operating in the receive mode may provide a reference frequency signal to the communication circuit 205.

The control circuit 204 may be a controller of a communications processor, an application processor, or a communications circuit. The control circuit 204 may control the switch 203 based on a frequency band used for communication with an external electronic device.

Alternatively, the control circuit 204 may control the operation of the switch 203 based on whether three or more carrier frequency bands included in one frequency band are used for communication with an external electronic device. For example, when three or more carrier frequency bands included in the first frequency band are used for communication with an external electronic device, the control circuit 204 may control the input port of the switch 203 to be connected to an output port connected to the sixth input port so that a signal of the third carrier frequency band included in the first frequency band is provided to the sixth input port of the communication circuit 205. In another example, when three or more carrier frequency bands included in the second frequency band are used for communication with an external electronic device, the control circuit 204 may control the input port of the switch 203 to be connected to an output port connected to the third input port so that a signal of the third carrier frequency band included in the second frequency band is provided to the third input port of the communication circuit 205.

Figure 2B:
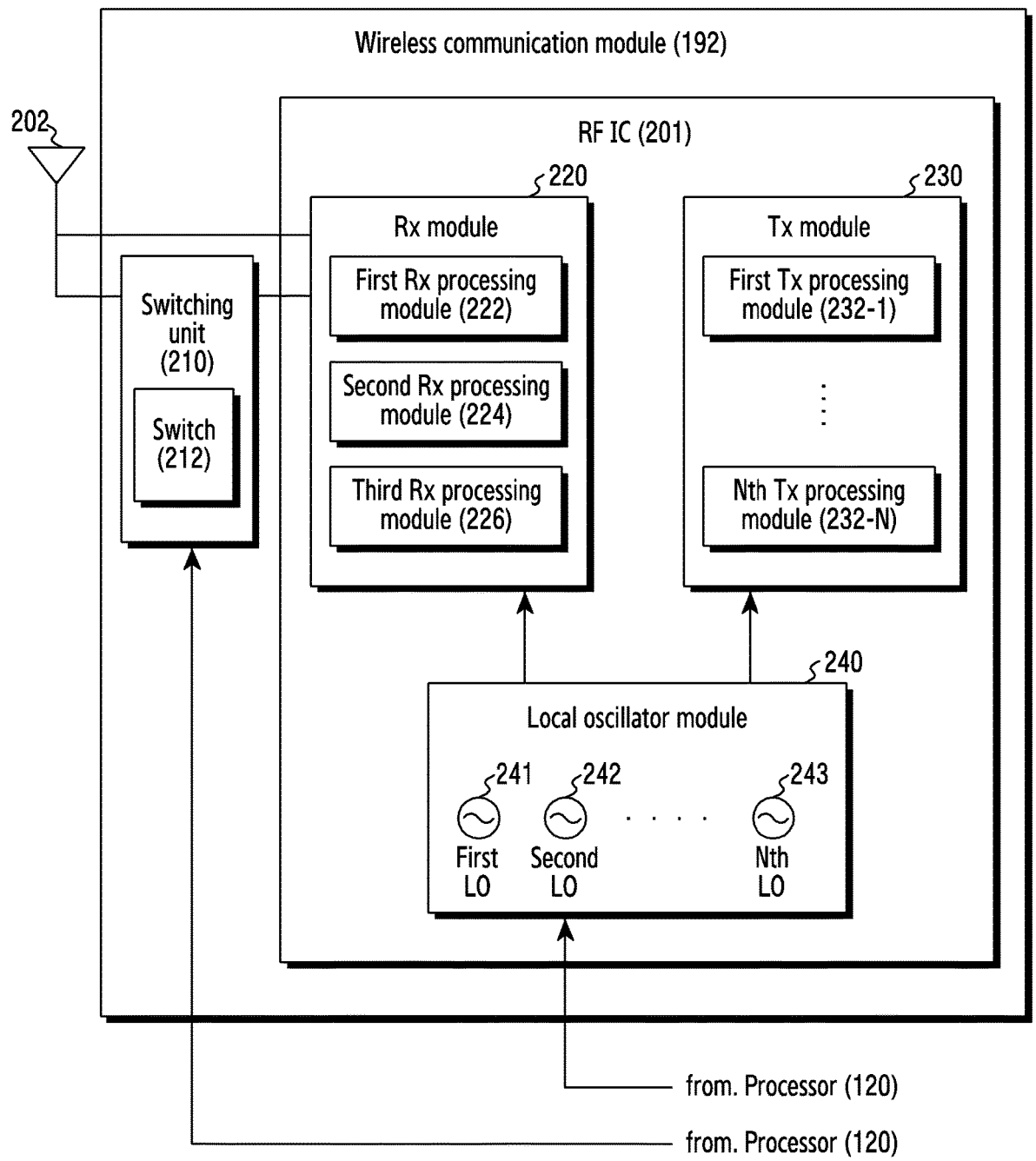
FIG. 2B illustrates a wireless communication module according to an embodiment.

FIG. 2B illustrates a wireless communication module according to an embodiment. Referring to FIG. 2B, a wireless communication module 192 includes a switching unit 210 and an RFIC 201. Alternatively, the wireless communication module 192 may further include at least one other component.

The switching unit 210 include at least one switch 212. The at least one switch 212 may include at least one SPDT switch and/or at least one DPDT switch. The switching unit 210 is disposed between an antenna 202 and the RFIC 201 (or between a duplexer and the RFIC 201) and may deliver a signal of at least one downlink carrier received from the antenna to the RFIC 201. For example, the switching unit 210 may receive a signal of a downlink carrier corresponding to at least one of a PCC or SCCs through the antenna, and may provide the received signal to at least one of a first Rx processing module 222, a second Rx processing module 224, or a third Rx processing module 226 included in an Rx module 220 of the RFIC 201 by performing a switching operation based on a control signal provided from a processor.

When the at least one switch 212 includes at least one SPDT switch, an input port of the SPDT switch may be connected to receive a signal in a specified frequency band received via an antenna, and two output ports of the SPDT switch may be connected to different Rx processing modules. Different examples of such a scenario are described below with reference to FIGS. 3A to 3C.

Figure 3A:
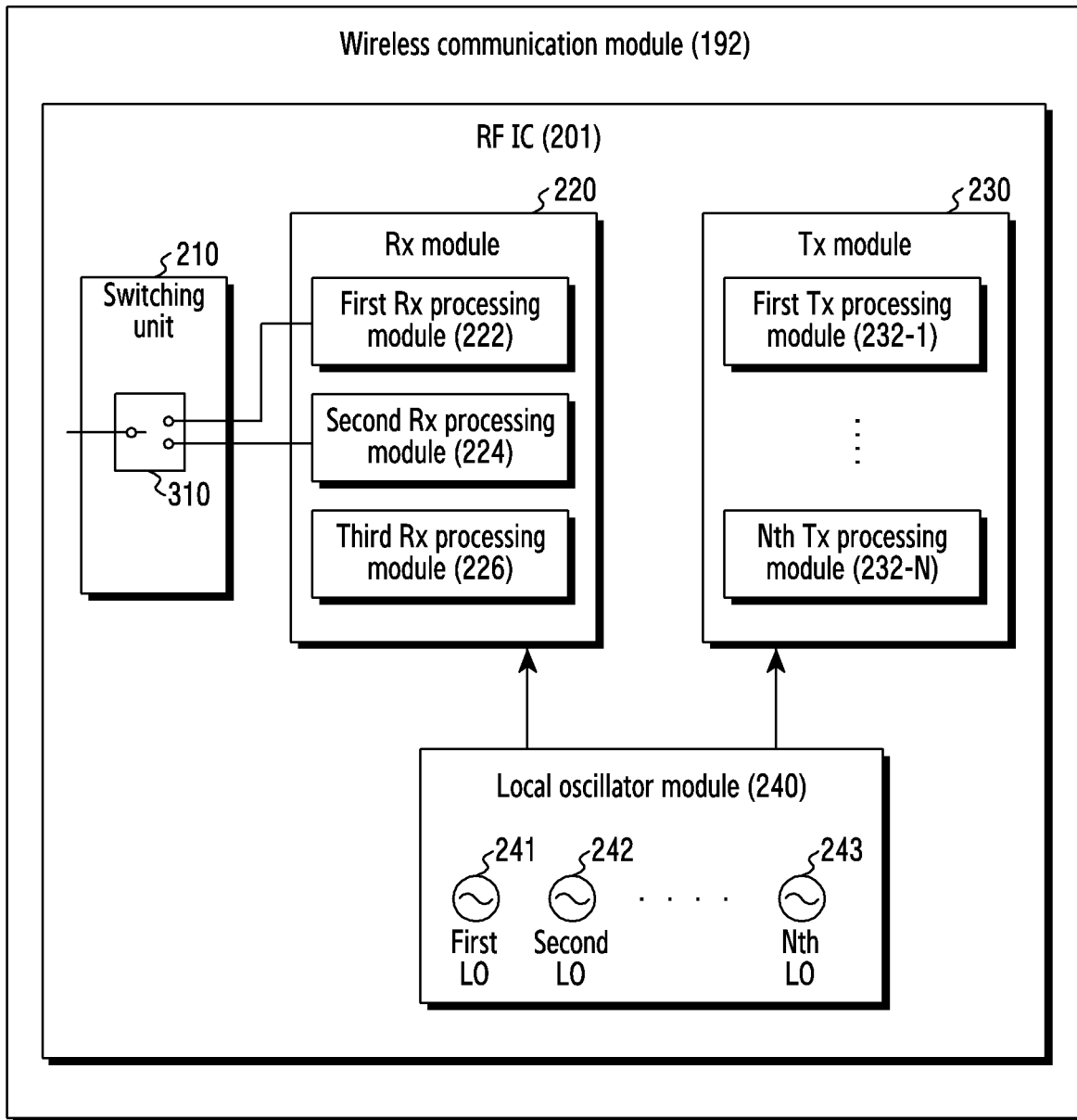
FIG. 3A illustrates an electronic device switching a port for a signal of at least one carrier frequency band using a single pole double throw (SPDT) switch according to an embodiment.

FIG. 3A illustrates an electronic device switching a port for a signal of at least one carrier frequency band using an SPDT switch according to an embodiment.

Referring to FIG. 3A, a first input port of a first SPDT switch 310 included in the switching unit 210 may be connected to receive a signal in a first carrier frequency band, a first output port may be connected to one specified input port among a plurality of input ports included in a first Rx processing module 222, and a second output port may be connected to one specified input port among a plurality of input ports included in a second Rx processing module 224. The switching unit 210 may control the switching operation of the first SPDT switch 310 based on a control signal provided from a processor, thereby providing the signal in the first carrier frequency band to either the first Rx processing module 222 or the second Rx processing module 224.

Figure 3B:
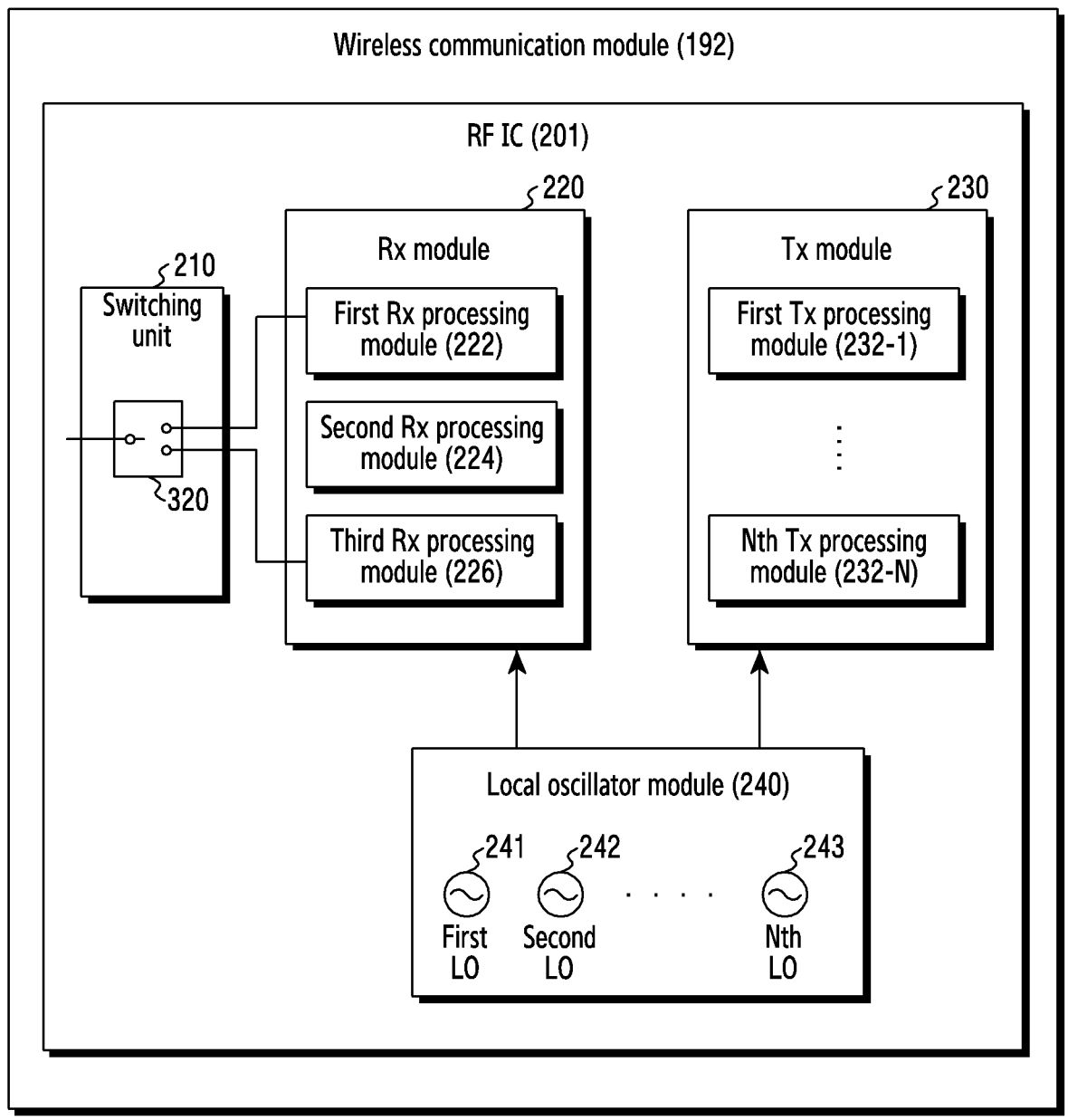
FIG. 3B illustrates an electronic device switching a port for a signal of at least one carrier frequency band using an SPDT switch according to an embodiment.

FIG. 3B illustrates an electronic device switching a port for a signal of at least one carrier frequency band using an SPDT switch according to an embodiment.

Referring to FIG. 3B, an input port of a second SPDT switch 320 included in the switching unit 210 may be connected to receive a signal in a second frequency band, a first output port may be connected to one specified input port among a plurality of input ports included in a first Rx processing module 222, and a second output port may be connected to one specified input port among a plurality of input ports included in a third Rx processing module 226. The switching unit 210 may control the switching operation of the second SPDT switch 320 based on a control signal provided from the processor, thereby providing the signal in the second carrier frequency band to either the first Rx processing module 222 or the third Rx processing module 226.

Figure 3C:
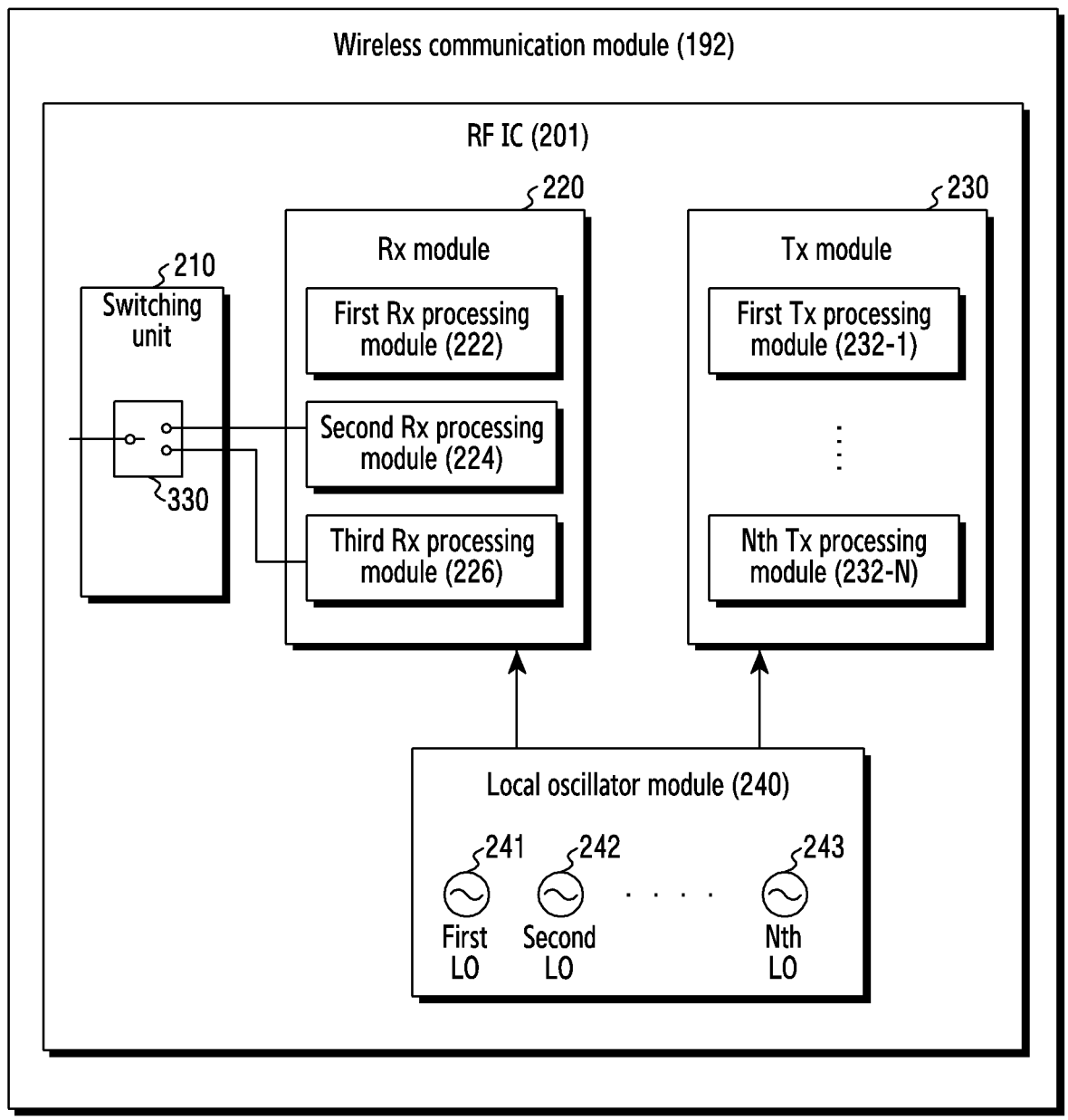
FIG. 3C illustrates an electronic device switching a port for a signal of at least one carrier frequency band using an SPDT switch according to an embodiment.

FIG. 3C illustrates an electronic device switching a port for a signal of at least one carrier frequency band using an SPDT switch according to an embodiment.

Referring to FIG. 3C, an input port of a third SPDT switch 330 included in the switching unit 210 may be connected to receive a signal in a third frequency band, a first output port may be connected to one specified input port among a plurality of input ports included in a second Rx processing module 224, and a second output port may be connected to one specified input port among a plurality of input ports included in a third Rx processing module 226. The switching unit 210 may control the switching operation of the third SPDT switch 330 based on a control signal provided from a processor, thereby providing the signal in the third carrier frequency band to either the second Rx processing module 224 or the third Rx processing module 226.

Referring again to FIG. 2B, when the at least one switch 212 includes at least one DPDT switch, two input ports of the DPDT switch may be connected to receive signals in different carrier frequency bands received via an antenna, and two output ports of the DPDT switch may be connected to different Rx processing modules. Different examples of such a scenario are described below with reference to FIGS. 4A to 4C.

Figure 4A:
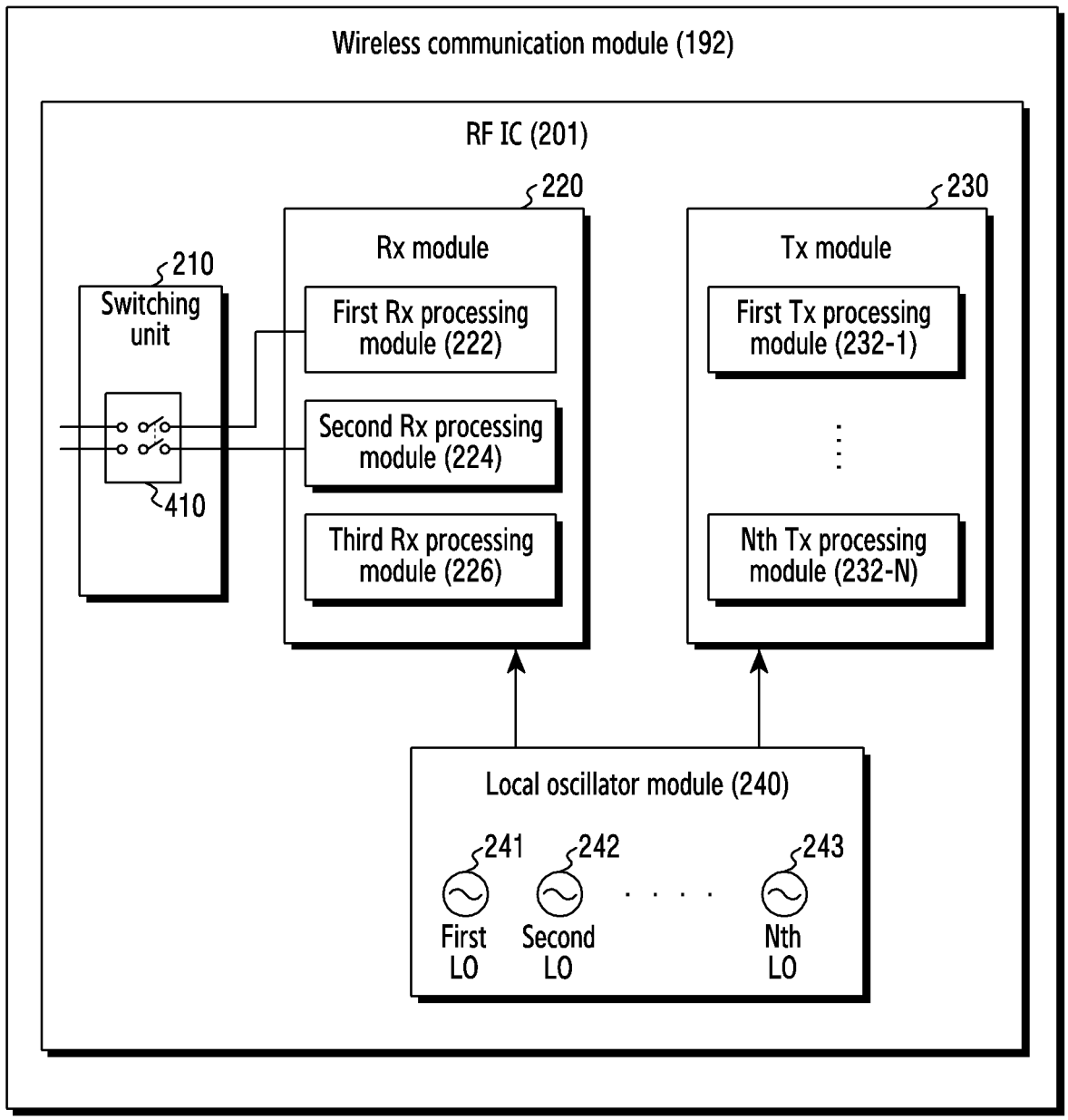
FIG. 4A illustrates an electronic device switching (or swapping) ports for signals of two carrier frequency bands using a double pole double throw (DPDT) switch according to an embodiment.

FIG. 4A illustrates an electronic device switching (or swapping) ports for signals of two carrier frequency bands using a DPDT switch according to an embodiment.

Referring to FIG. 4A, a first input port of a first DPDT switch 410 included in the switching unit 210 may be connected to receive a signal in a first carrier frequency band, a second input port may be connected to receive a signal in a second carrier frequency band, a first output port may be connected to one specified input port among a plurality of input ports included in a first Rx processing module 222, and a second output port may be connected to one specified input port among a plurality of input ports included in a second Rx processing module 224. The switching unit 210 may control the switching operation (or swapping operation) of the first DPDT switch 410 based on a control signal provided from a processor, thereby providing the signal in the first carrier frequency band to the first Rx processing module 222 and providing the signal in the second carrier frequency band to the second Rx processing module 224, or providing the signal in the first carrier frequency band to the second Rx processing module 224 and providing the signal in the second carrier frequency band to the first Rx processing module 222.

Figure 4B:
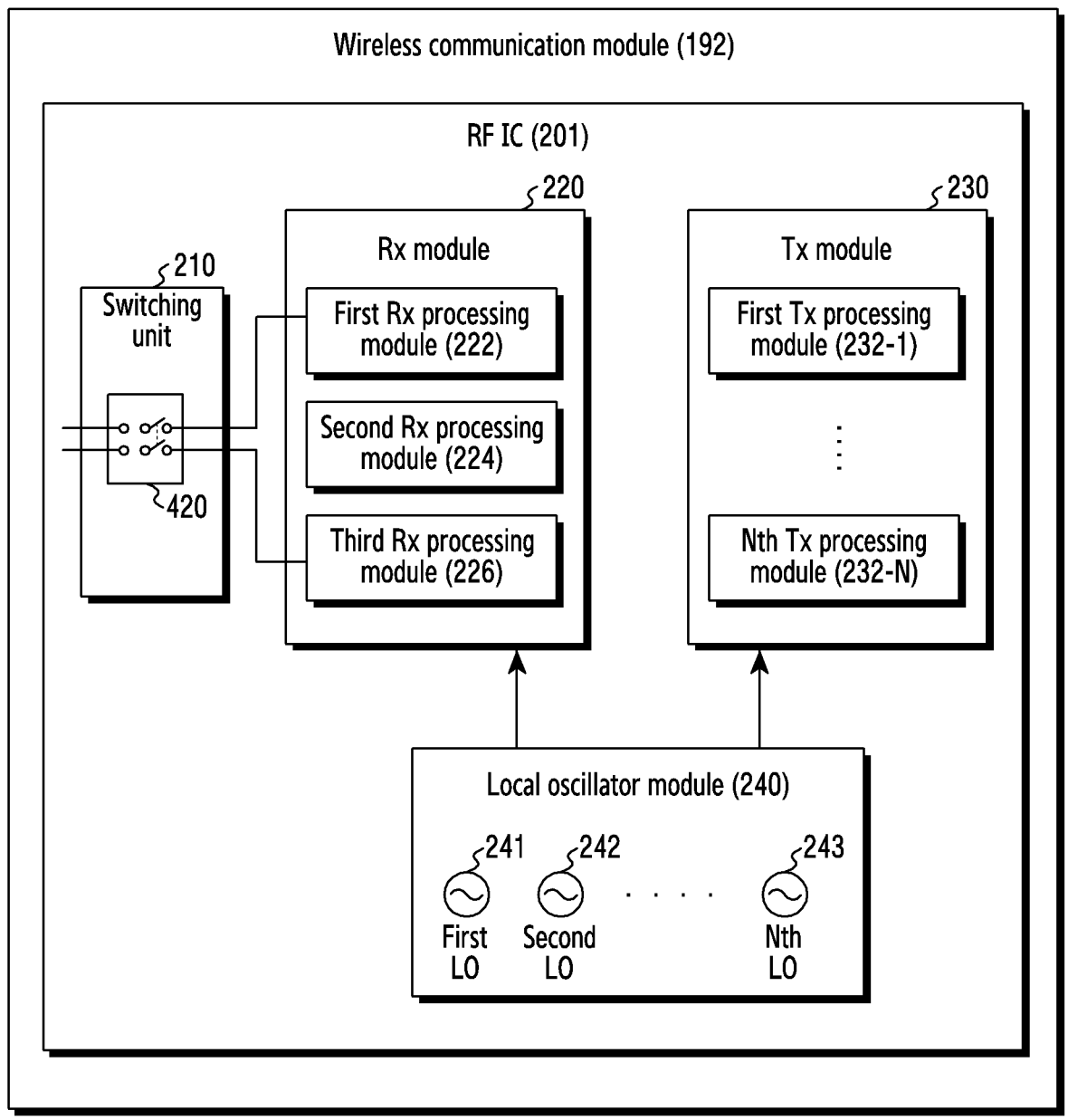
FIG. 4B illustrates an electronic device switching (or swapping) ports for signals of two carrier frequency bands using a DPDT switch according to an embodiment.

FIG. 4B illustrates an electronic device switching (or swapping) ports for signals of two carrier frequency bands using a DPDT switch according to an embodiment.

Referring to FIG. 4B, a first input port of a second DPDT switch 420 included in the switching unit 210 may be connected to receive a signal in a first carrier frequency band, a second input port may be connected to receive a signal in a second carrier frequency band, a first output port may be connected to one specified input port among a plurality of input ports included in a first Rx processing module 222, and a second output port may be connected to one specified input port among a plurality of input ports included in a third Rx processing module 226. The switching unit 210 may control the switching operation (or swapping operation) of the second DPDT switch 420 based on a control signal provided from a processor, thereby providing the signal in the first carrier frequency band to the first Rx processing module 222 and providing the signal in the second carrier frequency band to the third Rx processing module 226, or providing the signal in the first carrier frequency band to the third Rx processing module 226 and providing the signal in the second carrier frequency band to the first Rx processing module 222.

Figure 4C:
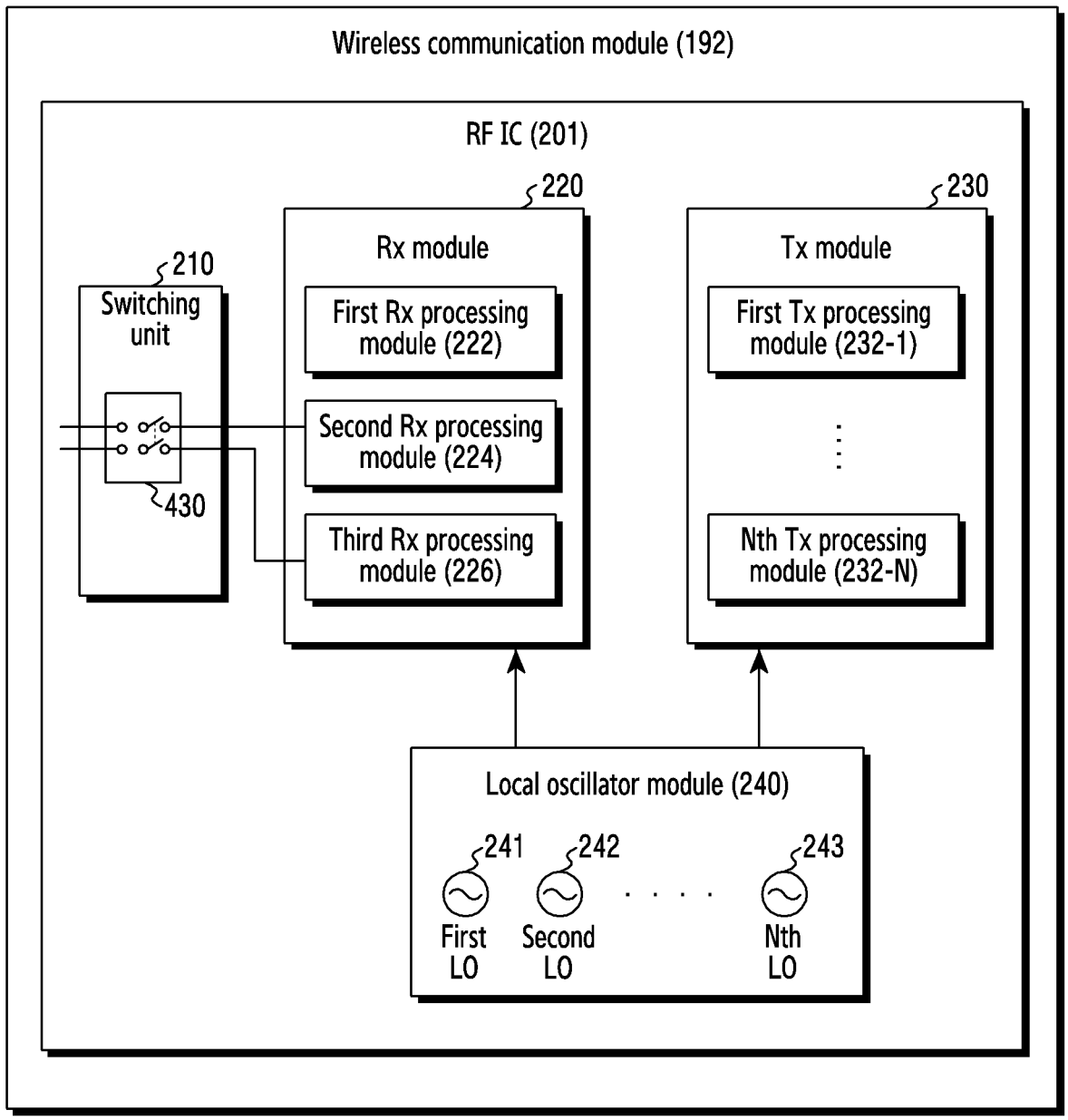
FIG. 4C illustrates an electronic device switching (or swapping) ports for signals of two carrier frequency bands using a DPDT switch according to an embodiment.

FIG. 4C illustrates an electronic device switching (or swapping) ports for signals of two carrier frequency bands using a DPDT switch according to an embodiment.

Referring to FIG. 4C, a first input port of a third DPDT switch 430 included in the switching unit 210 may be connected to receive a signal in a first carrier frequency band, a second input port may be connected to receive a signal in a second carrier frequency band, a first output port may be connected to one specified input port among a plurality of input ports included in a second Rx processing module 224, and a second output port may be connected to one specified input port among a plurality of input ports included in a third Rx processing module 226. The switching unit 210 may control the switching operation (or swapping operation) of the third DPDT switch 430 based on a control signal provided from a processor, thereby providing the signal in the first carrier frequency band to the second Rx processing module 224 and providing the signal in the second carrier frequency band to the third Rx processing module 226, or providing the signal in the first carrier frequency band to the third Rx processing module 226 and providing the signal in the second carrier frequency band to the second Rx processing module 224.

The type of a switch included in the switching unit 210, the number of switches, and a structure for connecting a switch to an RFIC may be preset based on at least one of a frequency band held by a country and/or a mobile network operator, the number of carriers to be used for communication, a frequency band combination of carriers to be used for communication, whether Rx processing module have a spare port, the number of spare ports of Rx processing modules, the number of local oscillator supporting ports of Rx processing modules, or the type of a low-noise amplifier included in an Rx processing module. For example, when the number of local oscillator supporting ports of Rx processing modules is less than the number of carriers to be used and the Rx processing modules have a spare port, the switching unit 210 may be designed to include at least one SPDT.

As another example, when the number of local oscillator supporting ports of Rx processing modules is less than the number of carriers to be used and the Rx processing modules have no spare port, the switching unit 210 may be designed to include at least one DPDT. As another example, the connection structure of an SPDT switch or a DPDT switch may be determined based on whether a low-noise amplifier included in each Rx processing module is a type that can support all of a low band, a middle band, and a high band, a type that can support only two of the low band, the middle band, and the high band, or a type that can support only one of the low band, the middle band, and the high band. The number of local oscillator supporting ports of Rx processing modules may indicate the number of carrier frequency bands that the Rx processing modules can process.

Referring again to FIG. 2B, the RFIC 201 includes an Rx module 220, a Tx module 230, and a local oscillator module 240. The RFIC 201 may perform low-noise amplification of a radio frequency reception signal and may downconvert the signal into an intermediate-frequency signal using the Rx module 220 and the local oscillator (LO) module 240, and may upconvert an intermediate-frequency signal into a high-frequency signal using the Tx module 230 and the local oscillator module 240.

The Rx module 220 includes a plurality of Rx processing modules 222, 224, and 226. The plurality of Rx processing modules 222, 224, and 226 may process signals in different carrier frequency bands, respectively. For example, the first Rx processing module 222 may process a signal in a carrier frequency band corresponding to a low band (e.g., about 700 MHz to 1000 MHz), the second Rx processing module 224 may process a signal in a carrier frequency band corresponding to a middle band (e.g., about 1700 MHz to 2200 MHz), and the third Rx processing module 226 may process a signal in a carrier frequency band corresponding to a high band (e.g., about 2300 MHz to 2700 MHz). Each of the Rx processing modules 222, 224, 246 may include a plurality of input ports and may receive a signal in at least one carrier frequency band through the plurality of input ports. For example, the first Rx processing module 222 may include a first input port (or a signal terminal) configured for communication using a first carrier frequency band corresponding to the low band, a second input port configured for communication using a second carrier frequency band corresponding to the low band, and a third input port configured for communication using a third carrier frequency band corresponding to the low band. The second Rx processing module 224 may include a fourth input port configured for communication using a first carrier frequency band corresponding to the middle band, a fifth input port configured for communication using a second carrier frequency band corresponding to the middle band, and a sixth input port configured for communication using a third carrier frequency band corresponding to the middle band. The third Rx processing module 226 may include a seventh input port configured for communication using a first carrier frequency band corresponding to the high band, an eighth input port configured for communication using a second carrier frequency band corresponding to the high band, and a ninth input port configured for communication using a third carrier frequency band corresponding to the high band.

At least one of the plurality of input ports included in each of the plurality of Rx processing modules 222, 224, and 246 may be connected to an output port of the at least one switch 212 included in the switching unit 210. For example, the third input port included in the first Rx processing module 222 may be connected to a first output port of the at least one switch 212, and the sixth input port included in the second Rx processing module 224 may be connected to a second output port of the at least one switch 212.

At least one other input port of the plurality of input ports included in each of the plurality of Rx processing modules 222, 224, and 246 may be electrically connected to the antenna 202. For example, the first and second input ports included in the first Rx processing module 222 and the fourth and fifth input ports included in the second Rx processing module 224 may be electrically connected to the antenna 202.

Figure 5:
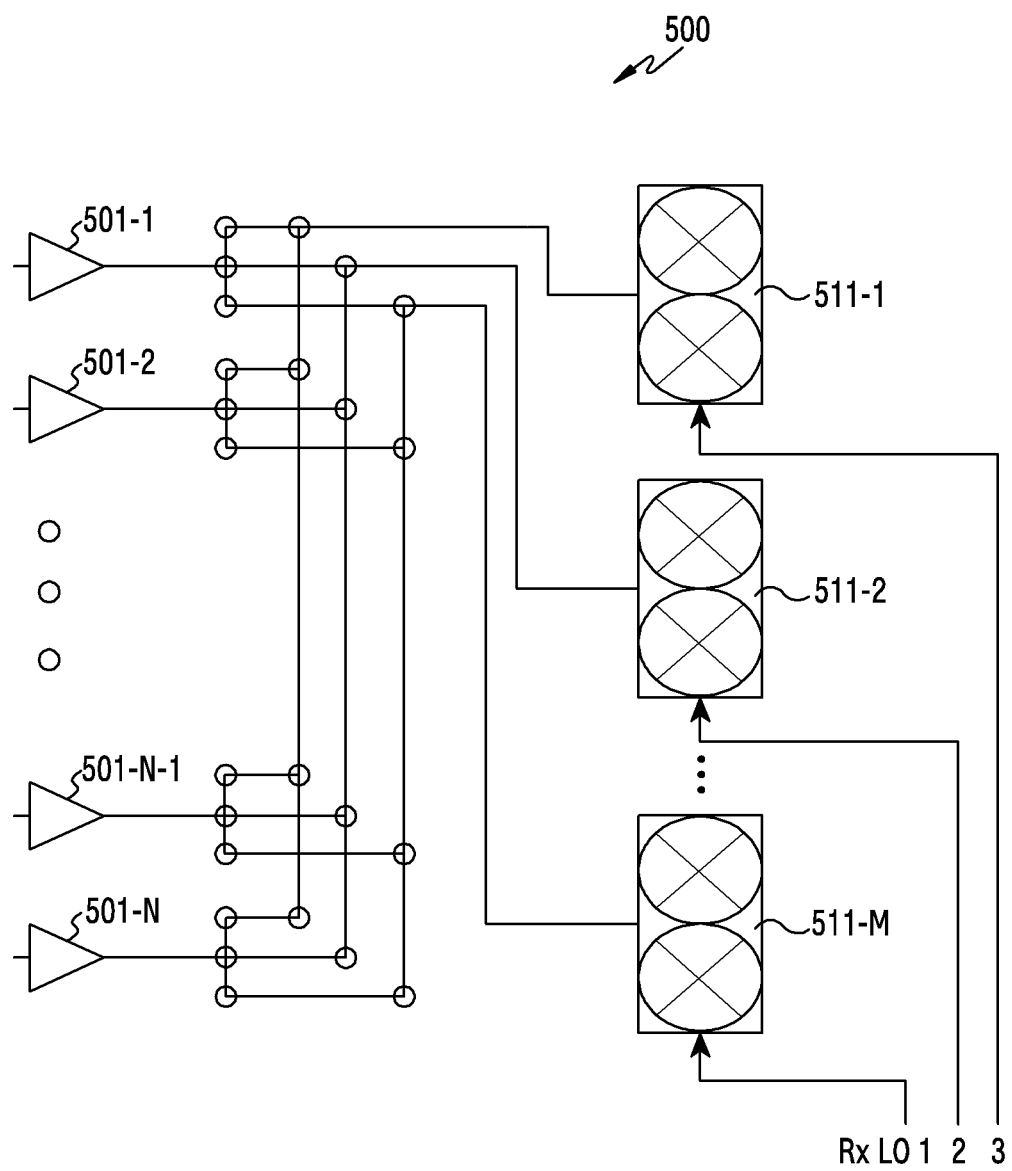
FIG. 5 illustrates a reception (Rx) processing module according to an embodiment.

FIG. 5 illustrates an Rx processing module according to an embodiment.

Referring to FIG. 5, an Rx processing module 500, e.g., each of the Rx processing modules 222, 224, and 226 in FIG. 2B, includes a plurality of low-noise amplifiers 501-1, 501-2, . . . , 501-N–1, and 501-N and a plurality of downconversion mixers 511-1, 511-2, . . . , and 511-M. Each of the plurality of low-noise amplifiers 501-1, 501-2, . . . , 501-N–1, and 501-N may perform low-noise amplification of a signal in a carrier frequency band input through a specified input port among the plurality of input ports included in the Rx processing module 500 and may output the amplified signal. Each of the plurality of downconversion mixers 511-1, 511-2, . . . , and 511-M may downconvert an amplified signal provided from any one of the plurality of low-noise amplifiers 501-1, 501-2, . . . , 501-N–1, and 501-N using a reference frequency signal provided from at least one local oscillator operating in a reception mode in a local oscillator module.

Referring again to FIG. 2B, the number of carrier frequency bands that can be processed by each of the Rx processing modules 222, 224, and 226 may be less than the number of downlink carriers used by the electronic device 101. For example, the number of ports configured in each of the Rx processing modules 222, 224, and 226 to receive a reference frequency signal from the local oscillator module 240 may be less than the number of downlink carriers used by the electronic device 101. For example, when the electronic device 101 operates in a mode using downlink 3CA, each of the Rx processing modules 222, 224, and 226 may receive a reference frequency signal from two local oscillators using two ports, thus processing only signals in two downlink carrier frequency bands.

The Tx module 230 includes a plurality of Tx processing modules 232-1 to 232-N. Each of the plurality of Tx processing modules 232-1 to 232-N may upconvert an intermediate-frequency signal into a high-frequency signal in a specified band and may amplify the upconverted signal with high power. For example, each of the plurality of Tx processing modules 232-1 to 232-N may convert an intermediate-frequency signal into a carrier signal corresponding to a low band in a high-frequency band, a carrier signal corresponding to a middle band, or a carrier signal corresponding to a high band using a reference frequency signal provided from the local oscillator module 240.

Figure 6:
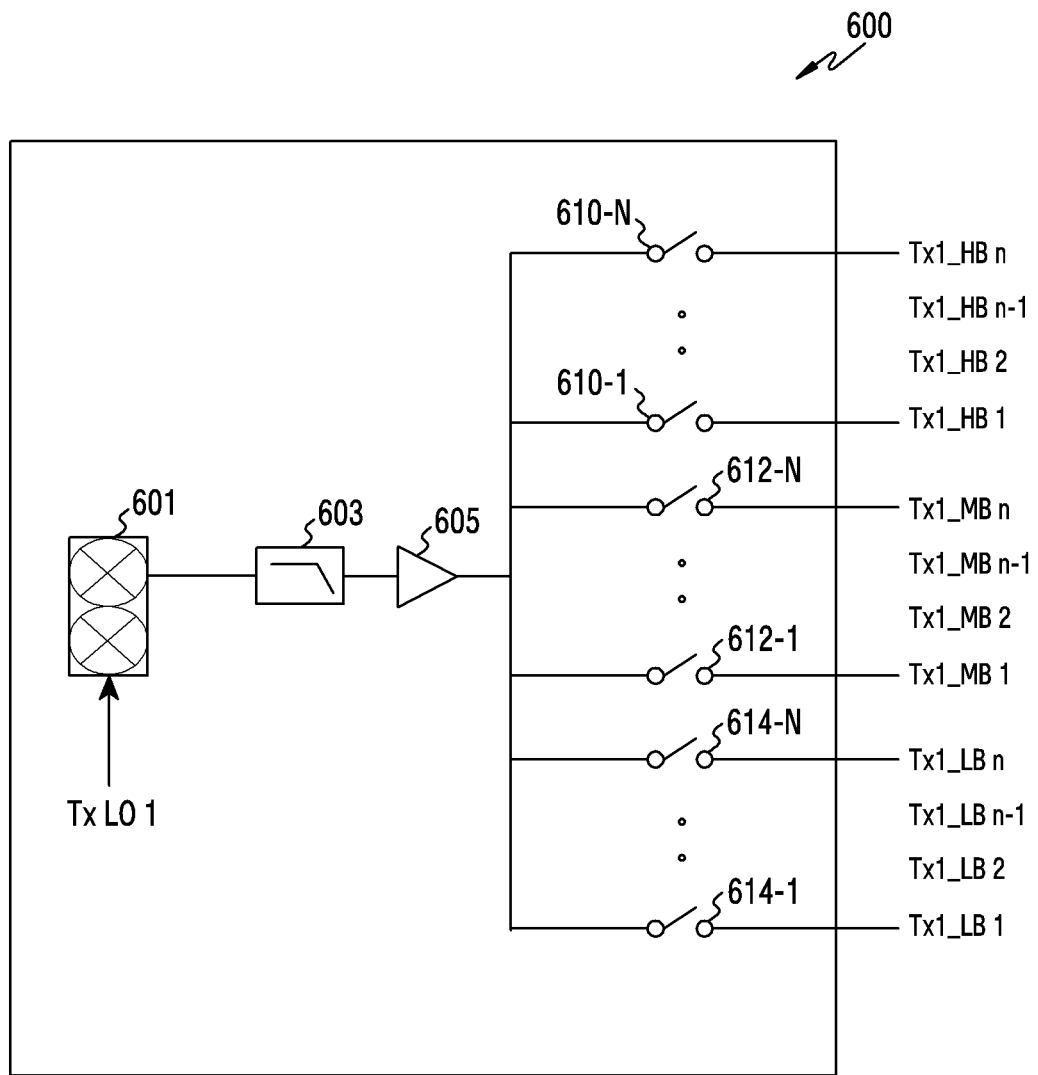
FIG. 6 illustrates a transmission (Tx) processing module according to an embodiment.

FIG. 6 illustrates a Tx processing module according to an embodiment.

Referring to FIG. 6, a Tx module 600, e.g., each of the Tx processing modules 232-1 to 232-N of FIG. 2B, includes an upconversion mixer 601, a band-pass filter 603, a power amplifier 605, and a switching unit 610. The upconversion mixer 601 may upconvert an intermediate-frequency signal into a high-frequency signal in a specified band using a reference frequency signal provided from any one local oscillator in the local oscillator modules 240. The band-pass filter 603 may filter and output a frequency in the specified band. The power amplifier 605 may amplify and output a signal provided from the band-pass filter with high power. The switching unit 610 may control at least one of a plurality of switches 610-1 to 610-N, 612-1 to 612-N, and 614-1 to 614-N under the control of a processor 120, thereby outputting the signal from the power amplifier 605 to an antenna (or a duplexer).

Referring again to FIG. 2B, the local oscillator module 240 includes a plurality of local oscillators 241, 242, and 243. Each of the local oscillators 241, 242, and 243 may generate a reference frequency signal and may provide the generated reference frequency signal to the Rx module 220 or the Tx module 230. Each of the local oscillators 241, 242, and 243 may be an Rx local oscillator, a Tx local oscillator, or an Rx-Tx local oscillator. The Rx local oscillator is a local oscillator operating in a reception mode regardless of the number of carriers used by the electronic device 101 and may provide a reference frequency signal to any one of the Rx processing modules 222, 224, and 226 included in the Rx module 220 under the control of the processor 120. The Tx local oscillator is a local oscillator operating in a transmission mode regardless of the number of carriers used by the electronic device and may provide a reference frequency signal to any one of the Tx processing modules 232-1 to 232-N included in the Tx module 230 under the control of the processor. The Rx-Tx local oscillator is a local oscillator operating in either the reception mode or the transmission mode based on the number of carriers used by the electronic device 101. The Rx-Tx local oscillator may operate in the transmission mode under the control of the processor 120, and may provide a reference frequency signal to any one of the Tx processing modules 232-1 to 232-N included in the Tx module 230 while operating in the transmission mode. The Rx-Tx local oscillator may operate in the reception mode under the control of the processor 120, and may provide a reference frequency signal to any one of the Rx processing modules 222, 224, and 226 included in the Rx module 220 while operating in the reception mode.

Figure 7A:
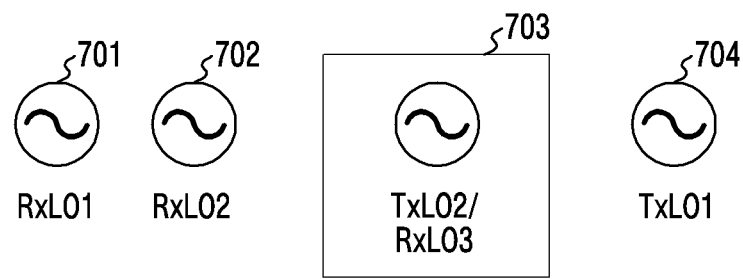
FIG. 7A illustrates a configuration of local oscillators according to an embodiment.

FIG. 7A illustrates a configuration of local oscillators according to an embodiment.

Referring to FIG. 7A, a local oscillator module, e.g., the local oscillator module 240, may include two Rx local oscillators 701 and 702, one Rx-Tx local oscillator 703, and one Tx local oscillator 704.

Figure 7B:
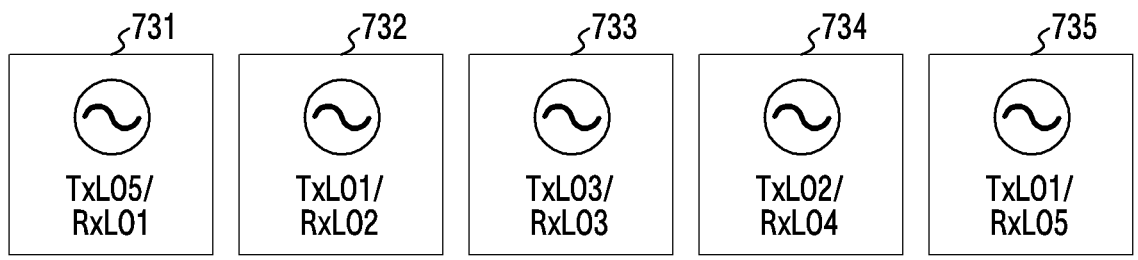
FIG. 7B illustrates a configuration of local oscillators according to an embodiment.

FIG. 7B illustrates a configuration of local oscillators according to an embodiment. Referring to FIG. 7B, a local oscillator module, e.g., the local oscillator module 240, may include five Rx-Tx local oscillators 731, 732, 733, 734, and 735. These configurations of the local oscillator module 240 are provided for illustrative purposes, and the embodiments described herein are not limited thereto. For example, the number of Rx local oscillators included in the local oscillator module 240, the number of Rx-Tx local oscillators included therein, or the number of Tx local oscillators included therein may be variously set and/or changed by a designer.

Referring again to FIG. 2B, a processor (e.g., the processor 120 in FIG. 1 or the control circuit 204 in FIG. 2A) may determine frequency bands of downlink carriers to be used for communication based on the operation mode of the electronic device. For example, the processor may determine frequency bands of downlink carriers to be used for downlink communication of the electronic device. The processor 120 may control the switching operation of the switching unit 210 based on the determined frequency bands of the downlink carriers and a specified condition.

The specified condition may be set based on at least one of the number of downlink carriers to be used by the electronic device and the number of carrier frequency bands that can be processed by each of the Rx processing modules 222, 224, and 226. For example, when the number of downlink carriers to be used by the electronic device is less than the number of carrier frequency bands that can be processed by each of the Rx processing modules 222, 224, and 226, a condition for a frequency band of the downlink carriers to be used may be specified and/or set. As one example, when the number of carrier frequency bands that can be processed by each of the Rx processing modules 222, 224, and 226 is two and the number of downlink carriers to be used by the electronic device 101 is three or more, a condition specified for the three or more downlink carriers may be set to L-L-L, M-M-M, and/or H-H-H. L-L-L indicates that a frequency band of at least three downlink carriers among the downlink carriers to be used corresponds to a low band. M-M-M indicates that a frequency band of at least three downlink carriers among the downlink carriers to be used corresponds to a middle band. H-H-H indicates that a frequency band of at least three downlink carriers among the downlink carriers to be used corresponds to a high band.

As another example, when the number of carrier frequency bands that can be processed by each of the Rx processing modules 222, 224, and 226 is three and the number of downlink carriers to be used by the electronic device 101 is four or more, a condition specified for the four or more downlink carriers may be set to L-L-L-L, M-M-M-M, and/or H-H-H-H. L-L-L-L indicates that frequency bands of at least four downlink carriers among the downlink carriers to be used correspond to a low band. M-M-M-M indicates that frequency bands of at least four downlink carriers among the downlink carriers to be used correspond to a middle band. H-H-H-H indicates that frequency bands of at least four downlink carriers among the downlink carriers to be used correspond to a high band.

When the frequency bands of the downlink carriers to be used by the electronic device do not satisfy the specified condition, the processor may control the switching operation of the switching unit 210 according to a preset default setting value. For example, when the frequency bands of the at least three downlink carriers among the downlink carriers to be used do not satisfy L-L-L, M-M-M, or H-H-H, the processor may provide, to the switching unit 210, a control signal to perform the switching operation according to the preset default setting value. For example, the processor may control the switching unit 210 so that each of the downlink carriers to be used is provided to an Rx processing module configured to process a carrier signal in a corresponding frequency band.

As one example, when frequency bands of three downlink carriers to be used are Band 3 and Band 4, which correspond to the middle band, and Band 38, which corresponds to the high band, the processor may control the switching unit 210 so that carrier signals corresponding to Band 3 and Band 4 are provided to the second Rx processing module 224 configured to process a carrier signal in the middle band and a carrier signal corresponding to Band 38 provided to the third Rx processing module 226 configured to process a carrier signal in the high band.

When the frequency bands of the downlink carriers to be used by the electronic device for communication satisfy the specified condition, the processor may control the switching operation of the switching unit 210 based on at least one of the number of carrier frequency bands that can be processed by each of the Rx processing modules 222, 224, and 226 and the type of an LNA included in each of the Rx processing modules 222, 224, and 226.

The processor may control the switching operation of the switching unit 210 such that the number of carrier signals provided to one Rx processing module is less than or equal to the number of carrier frequency bands that can be processed by each of the Rx processing modules 222, 224, and 226. The processor may identify a frequency band that can be processed by each of the Rx processing modules 222, 224, and 226 based on the type of low-noise amplifiers (e.g., the low-noise amplifiers 501-1, 501-2, . . . , 501-N–1, and 501-N in FIG. 5) included in the respective Rx processing modules 222, 224, and 226, and may control the switching operation of the switching unit 210 so that a carrier signal in a frequency band that can be processed by each of the Rx processing modules 222, 224, and 226 is provided to the correct module.

As one example, when frequency bands of three downlink carriers to be used by the electronic device correspond to M-M-M and the number of carrier frequency bands that can be processed by the second Rx processing module 224 configured to process a carrier signal in the middle band is two, the processor may control the switching operation of the switching unit 210 so that signals of only two downlink carriers among the three downlink carriers are provided to the second Rx processing module 224 and a signal of the remaining one downlink carrier is provided to the first Rx processing module 222 or the third Rx processing module 226, which is configured to process a carrier signal in the low band or the high band but is capable of processing a carrier signal in the middle band. For example, when the frequency bands of the three downlink carriers to be used are Band 2, Band 3, and Band 4, which correspond to the middle band, the processor may control the switching unit 210 so that carrier signals corresponding to Band 2 and Band 3 are provided to the second Rx processing module 224 configured to process a carrier signal in the middle band and a carrier signal corresponding to Band 4 is provided to the third Rx processing module 226, which is configured to process a carrier signal in the high band, but is capable of processing a carrier signal in the middle band, or to the first Rx processing module 222, which is configured to process a carrier signal in the low band, but is capable of processing a carrier signal in the middle band.

As another example, when frequency bands of three downlink carriers among four downlink carriers to be used by the electronic device correspond to M-M-M and the number of carrier frequency bands that can be processed by the second Rx processing module 224 configured to process a carrier signal in the middle band is two, the processor may control the switching operation of the switching unit 210 so that signals of only two downlink carriers among the three downlink carriers corresponding to the middle band are provided to the second Rx processing module 224 and a signal of the remaining one downlink carrier is processed by the first Rx processing module 222 or the third Rx processing module 226. For example, when the frequency bands of the four downlink carriers to be used are Band 2, Band 3, and Band 4, which correspond to the middle band, and Band 40, which corresponds to the high band, the processor may control the switching unit 210 so that carrier signals corresponding to Band 3 and Band 4 among Band 2, Band 3, and Band 4 are provided to the second Rx processing module 224 configured to process a carrier signal in the middle band, a carrier signal corresponding to Band 2 is provided to the third Rx processing module 226, which is configured to process a carrier signal in the high band, but is capable of processing a carrier signal in the middle band, or to the first Rx processing module 222, which is configured to process a carrier signal in the low band, but is capable of processing a carrier signal in the middle band, and a carrier signal corresponding to Band 40 is provided to the third Rx processing module 226, which is configured to process a carrier signal in the high band.

Alternatively, the processor may control the switching operation of the switching unit 210 based on a preset table. For example, the processor may obtain Table 1 from a memory (e.g., the memory 130 in FIG. 1) and may control the switching operation of the switching unit 210 based on Table 1.

Table 1 below shows the switching mode of the switching unit 210 according to a frequency band (the coverage of a band) that each of the Rx processing modules 222, 224, and 226 can process when the frequency bands of the downlink carriers to be used by the electronic device satisfy the specified conditions.

frequency bands to be used for communication that do not satisfy the condition L-L-L. As another example, when the first Rx processing module 222 covers only the low band, the second Rx processing module 224 covers only the middle band, and the third Rx processing module 226 covers only the high band, the processor may determine downlink carrier frequency bands to be used for communication that do not satisfy the conditions L-L-L, M-M-M, and H-H-H.

The processor may operate at least one local oscillator based on at least one of the number of uplink carriers and the number of downlink carriers according to the operation mode of the electronic device.

The operation mode of the electronic device may include a transmission mode for communication using at least one uplink carrier, a reception mode for communication using at least one downlink carrier, or a transceiving mode for communication using both at least one uplink carrier and at least one downlink carrier. For example, an electronic device supporting time division duplex (TDD) may operate in the transmission mode in which the electronic device performs uplink communication using at least one uplink carrier during a first time interval and may operate in the reception mode in which the electronic device performs downlink communication using at least one downlink carrier during a second time interval.

As another example, an electronic device supporting frequency division duplex (FDD) may operate in the trans-

TABLE 1

| | When specified condition "L-L-L" is satisfied | When specified condition "M-M-M" is satisfied | When specified condition "H-H-H" is satisfied |
|---|---|---|---|
| When all Rx processing modules cover a wide band | To switch such that the first Rx processing module processes two carrier signals and the remaining one signal is provided to the second Rx processing module or the third Rx processing module | To switch such that the second Rx processing module processes two carrier signals and the remaining one signal is provided to the first Rx processing module or the third Rx processing module | To switch such that the third Rx processing module processes two carrier signals and the remaining one signal is provided to the first Rx processing module or the second Rx processing module |
| When the first Rx processing module covers a low band, the LNAs of and the second Rx processing module and the third Rx processing module cover a middle band and a high band | Not supported | To switch such that the second Rx processing module processes two carrier signals and the remaining one signal is provided to the third Rx processing module | To switch such that the third Rx processing module processes two carrier signals and the remaining one signal is provided to the second Rx processing module |
| Each Rx processing module covers only a corresponding module | Not supported | Not supported | Not supported |

Table 1 is provided for illustrative purposes, and the embodiments described herein are not limited thereto. The processor may control the switching operation of the at least one switch 212 included in the switching unit 210 in view of the switching mode shown in Table 1.

The processor may determine a carrier frequency band to be used for downlink communication in view of a frequency band that each of the Rx processing modules 222, 224, and 226 can process based on Table 1, in order to avoid a case where the carrier frequency band is not supported by the wireless communication module 192. For example, when the first Rx processing module 222 covers only the low band, and the second Rx processing module 224 and the third Rx processing module 226 cover the middle band and the high band, the processor may determine downlink carrier ceiving mode, in which the electronic device performs downlink communication using at least one downlink carrier while performing uplink communication using at least one uplink carrier, during a third time interval. The operation mode of the electronic device may be classified according to the number of uplink carriers and the number of downlink carriers used by the electronic device for communication. For example, when an electronic device uses 'a' uplink carriers and 'b' downlink carriers, the operation mode of the electronic device may be referred to as an uplink aCA mode and downlink bCA mode.

The processor 120 may determine the operation mode of at least one local oscillator based on at least one of the number of uplink carriers and the number of downlink carrier according to the operation mode of the electronic device 101 and may operate at least one local oscillator based on the determined operation mode.

The processor 120 may determine the number of local oscillators to operate in a reception mode and the number of local oscillators to operate in a transmission mode based on at least one of the number of uplink carriers and the number of downlink carrier for the electronic device 101. The processor 120 may determine the operation mode of at least one local oscillator included in the local oscillator module 240 based on the number of local oscillators to operate in the reception mode and the number of local oscillators to operate in the transmission mode.

The processor 120 may output a control signal to the local oscillator module 240 based on the determined operation mode of the at least one local oscillator. For example, the processor 120 may provide, to the local oscillator module 240, a control signal to cause at least one local oscillator to operate in the transmission mode, to operate in the reception mode, or to operate alternately in the transmission mode and the reception mode. As an example, when the electronic device 101 uses one carrier for an uplink and three carriers for a downlink, the processor 120 may output, to the local oscillator module 240, a control signal that causes one local oscillator among the local oscillators 241, 242, and 243 included in the local oscillator module 240 to operate in the transmission mode and causes three local oscillators to operate in the reception mode.

As another example, when the electronic device 101 uses two carriers for the uplink and three carriers for the downlink, the processor 120 may output, to the local oscillator module 240, a control signal that causes two local oscillators among the local oscillators 241, 242, and 243 included in the local oscillator module 240 to operate in the transmission mode and causes three local oscillators to operate in the reception mode.

As another example, when the electronic device 101 supports TDD and uses two carriers for the uplink and three carriers the downlink and the total number of local oscillators 241, 242, and 243 included in the local oscillator module 240 is four, the processor 120 may output, to the local oscillator module 240, a control signal to change the operation mode of at least one local oscillator included in the local oscillator module 240 according to the operation mode of the electronic device. The processor 120 may control two of the four local oscillators included in the local oscillator module to operate regularly in the reception mode, one local oscillator to operate regularly in the transmission mode, and one local oscillator to dynamically switch and operate either in the transmission mode or in the reception mode depending on the operation mode of the electronic device.

The foregoing examples are provided for illustrative purposes, and the embodiments described herein are not limited thereto.

At least one operation performed by the processor 120 described above with reference to FIG. 2B may be performed by a communication processor included in the communication module 190 or a controller included in the wireless communication module 192 instead.

According to an embodiment, an electronic device may include a first oscillator; a second oscillator; a third oscillator; a communication circuit configured to be electrically connected to the first oscillator, the second oscillator, and the third oscillator and to include a first signal terminal configured for communication using a first carrier frequency band included in a first frequency band, a second signal terminal configured for communication using a second carrier frequency band included in the first frequency band, a third signal terminal configured for communication using a third carrier frequency band included in the first frequency band, a fourth signal terminal configured for communication using a first carrier frequency band included in a second frequency band, a fifth signal terminal configured for communication using a second carrier frequency band included in the second frequency band, and a sixth signal terminal configured for communication using a third carrier frequency band included in the second frequency band; a switch configured to include a first terminal, a second terminal electronically connected to the third signal terminal, and a third terminal electrically connected to the sixth signal terminal and to selectively connect the first terminal to the second terminal or the third terminal; at least one antenna configured to be electrically connected to the first signal terminal, the second signal terminal, the fourth signal terminal, the fifth signal terminal, and the first terminal; and a control circuit, wherein, when communication with an external electronic device is needed using two or less carrier frequency bands in one of the first frequency band and the second frequency band, the control circuit may be configured to communicate with the external electronic device using the first carrier frequency band or the second carrier frequency band included in the one frequency band; and when communication with the external electronic device is needed using three or more carrier frequency bands in one of the first frequency band and the second frequency band, the control circuit may be configured to connect the first terminal to either the second terminal or the third terminal using the switch and to communicate with the external electronic device using the first carrier frequency band, the second carrier frequency band, and the third carrier frequency band included in the one frequency band.

When communication with the external electronic device is needed using three or more carrier frequency bands corresponding to the first frequency band, the control circuit may be configured to connect the first terminal with the third terminal using the switch so that at least one carrier frequency band among the three or more carrier frequency bands corresponding to the first frequency band is provided to the sixth signal terminal; and when communication with the external electronic device is needed using three or more carrier frequency bands corresponding to the second frequency band, the control circuit may be configured to connect the first terminal with the second terminal using the switch so that at least one carrier frequency band among the three or more carrier frequency bands corresponding to the second frequency band is provided to the third signal terminal.

The switch may be an SPDT switch or a DPDT switch.

The communication circuit may include a first reception circuit configured to receive a signal in at least one carrier frequency band through at least one of the first signal terminal, the second signal terminal, or the third signal terminal; and a second reception circuit configured to receive a signal in at least one carrier frequency band through at least one of the fourth signal terminal, the fifth signal terminal, or the sixth signal terminal, and each of the first reception circuit and the second reception circuit may include at least one of a plurality of low-noise amplifiers or a plurality of downconversion mixers.

The control circuit may be configured to control at least one of the first oscillator, the second oscillator, or the third oscillator so that a reference frequency signal is provided to at least one of the first reception circuit or the second reception circuit.

The control circuit may be configured to control an operation of at least one of the first oscillator, the second oscillator, or the third oscillator based on at least one of a number of carriers used for downlink communication and a number of carriers used for uplink communication.

According to an embodiment, an electronic device may include a plurality of communication circuits configured to process carrier signals in different frequency bands; at least one switch configured to be connected to two communication circuits among the plurality of communication circuits and to provide a reception carrier signal to one of the two communication circuits based on a switching operation; and at least one processor, wherein the processor may be configured to determine frequency bands of a plurality of carriers to be used for communication, to control the switching operation based on the frequency bands of the plurality of carriers and a specified condition, and to process signals of the plurality of carriers using at least one communication circuit among the plurality of communication circuits.

The processor may be configured to determine whether frequency bands of at least some carriers among the plurality of carriers satisfy the specified condition; select a first frequency band from among the frequency bands of the at least some carriers satisfying the specified condition when the frequency bands of the at least some carriers satisfy the specified condition; and control the switching operation so that a carrier signal in the selected first frequency band is provided to a first communication circuit configured to process a carrier signal in a different frequency among the plurality of communication circuits and a carrier signal in a second frequency band among the frequency bands of the at least some carriers is provided to a second communication circuit configured to process the carrier signal in the second frequency band among the plurality of communication circuits.

When the frequency bands of the at least some carriers do not satisfy the specified condition, the processor may be configured to control the switching operation so that a signal of each of the plurality of carriers is provided to a communication circuit configured to process a signal in a corresponding frequency band.

The processor may be configured to determine a frequency band that is processable by each of the plurality of communication circuits at least based on a type of at least one low-noise amplifier included in each of the plurality of communication circuits; determine at least one communication circuit to process a signal of at least one carrier satisfying the specified condition among the plurality of carriers at least based on the frequency band that is processable by each of the plurality of communication circuits; and control the switching operation so that the signal of the at least one carrier is provided to the at least one determined communication circuit, and each of the plurality of communication circuits may be configured to process a carrier signal in at least part of the frequency band that is processable.

The at least one switch may include at least one of an SPDT switch or a DPDT switch.

Each of the plurality of communication circuits may include at least one of a plurality of low-noise amplifiers and a plurality of downconversion mixers, a plurality of low-noise amplifiers and a plurality of downconversion mixers.

The specified condition may include a condition for a frequency band of at least some carriers among the plurality of carriers and may be set based on at least one of the number of the plurality of carriers and the number of carrier frequency bands processable by each of the plurality of communication circuits.

The electronic device may further include a plurality of local oscillators, wherein the processor may be configured to determine an operation mode of at least one local oscillator among the plurality of local oscillators based on at least one of the number of downlink carriers and the number of uplink carriers.

At least one local oscillator operating in a reception mode may provide a reference frequency signal to the at least one communication circuit among the plurality of communication circuits based on the determined operation mode.

The processor may be configured to control the at least one local oscillator to alternately operate in a transmission mode and the reception mode based on an operation mode of the electronic device.

According to an embodiment, an electronic device may include a communication circuit configured to include a plurality of local oscillators; and at least one processor, wherein the processor may be configured to determine an operation mode of at least one local oscillator among the plurality of oscillators based on at least one of a number of uplink carriers and a number of downlink carriers; and control the at least one local oscillator to operate based on the determined operation mode.

The processor may be configured to determine, based on an operation mode of the electronic device, the operation mode of the at least one local oscillator so that the at least one oscillator operates alternately in a transmission mode and a reception mode.

The communication circuit may include a reception circuit configured to process at least one downlink carrier signal and a transmission circuit configured to process at least one uplink carrier signal, and the at least one local oscillator may provide a first reference frequency signal to the transmission circuit when operating in the transmission mode and may provide a second reference frequency to the reception circuit when operating in the reception mode.

In the following embodiments described with reference to FIGS. 8, 9A, 9B, and 10, operations may be sequentially performed but may not necessarily be performed sequentially. For example, the order of operations may be changed, and at least two operations may be performed in parallel.

Figure 8:
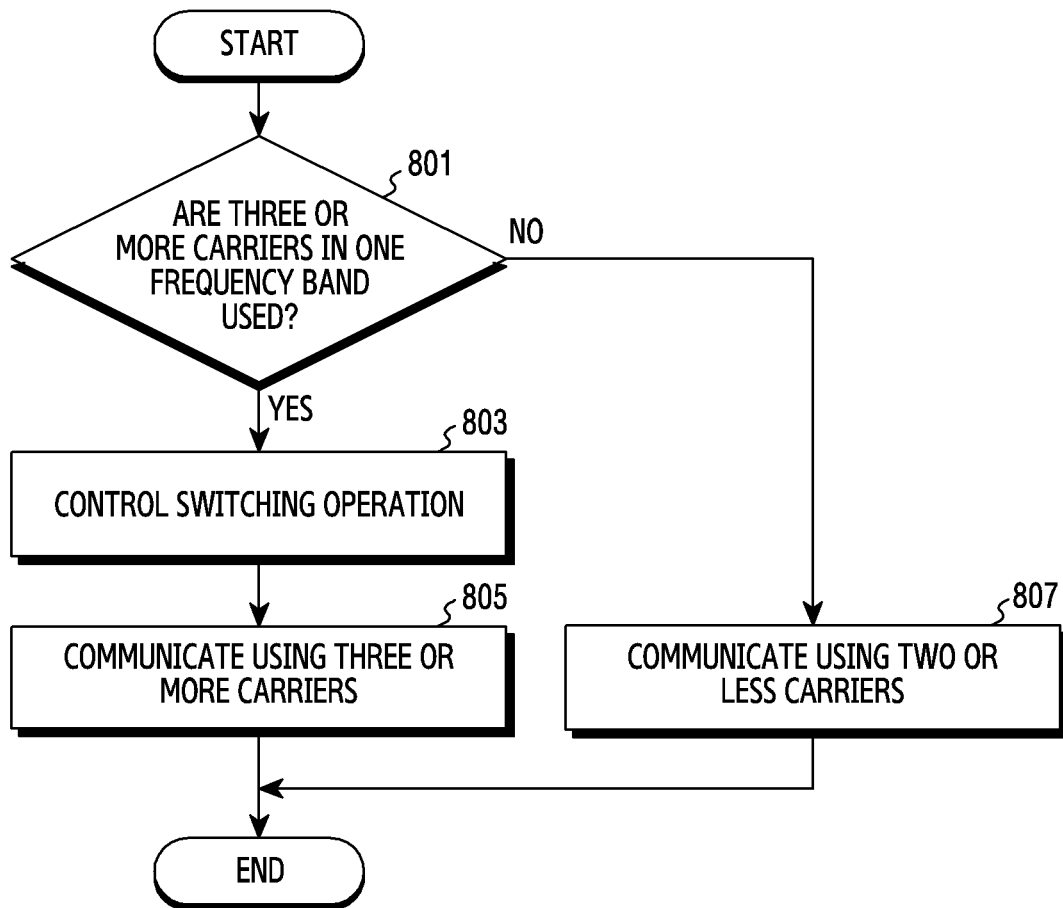
FIG. 8 is a flowchart illustrating a method of an electronic device for processing reception carrier signals according to an embodiment.

FIG. 8 is a flowchart illustrating a method of an electronic device for processing reception carrier signals according to an embodiment. For example, the electronic device of FIG. 8 may be the electronic device 101 of FIG. 1.

Referring to FIG. 8, the electronic device determines whether to use three or more carrier frequency bands in one frequency band for communication with an external electronic device in operation 801. For example, the processor 120 or the control circuit 204 may determine whether to use three or more carrier frequency bands in one of a first frequency band and a second frequency band for communication with an external device.

When three or more carrier frequency bands in one frequency band are used, the electronic device controls a switching operation in operation 803. For example, the processor 120 or the control circuit 204 may control the operation of a switch 212 having two output ports connected with two of input ports of a communication circuit (e.g., the Rx module 220). The communication circuit may include a first input port configured for communication using a first carrier frequency band included in a first frequency band, a second input port configured for communication using a second carrier frequency band included in the first frequency band, a third input port configured for communication using a third carrier frequency band included in the first frequency band, a fourth input port configured for communication using a first carrier frequency band included in the second frequency band, a fifth input port configured for communication using a second carrier frequency band included in the second frequency band, and a sixth input port configured for communication using a third carrier frequency band included in the second frequency band. The output ports of the switch 212 may be connected to the third input port and the sixth input port. The processor 120 or the control circuit 204 may control the operation of the switch connected to the third input port configured for communication using the third carrier frequency band included in the first frequency band and the sixth input port configured for communication using the third carrier frequency band included in the second frequency band among the input ports of the communication circuit.

When communication with an external electronic device using three or more carrier frequency bands corresponding to the first frequency band is needed, the processor 120 or the control circuit 204 may control the operation of the switch 212 so that at least one carrier frequency band of the three or more carrier frequency bands corresponding to the first frequency band is provided to the sixth input port. Alternatively, when communication with an external electronic device using three or more carrier frequency bands corresponding to the second frequency band is needed, the processor 120 or the control circuit 204 may control the operation of the switch 212 so that at least one carrier frequency band of the three or more carrier frequency bands corresponding to the second frequency band is provided to the third input port.

In operation 805, the electronic device communicates with an external electronic device using the three or more carrier frequency bands included in the one frequency band. For example, the processor 120 or the control circuit 204 may perform low-noise amplification and down-conversion of a signal in three or more carrier frequency bands included in one of the first frequency band and the second frequency band using the communication circuit.

However, when it is determined that two or less carrier frequency bands in one frequency band are used in operation 801, the electronic device communicate with an external electronic device using the two or less carrier frequency bands included in the one frequency band in operation 807. For example, the processor 120 or the control circuit 204 may perform low-noise amplification and down-conversion of a signal in at least one of the first carrier frequency band and the second carrier frequency band included in one of the first frequency band and the second frequency band using the communication circuit.

Figure 9A:
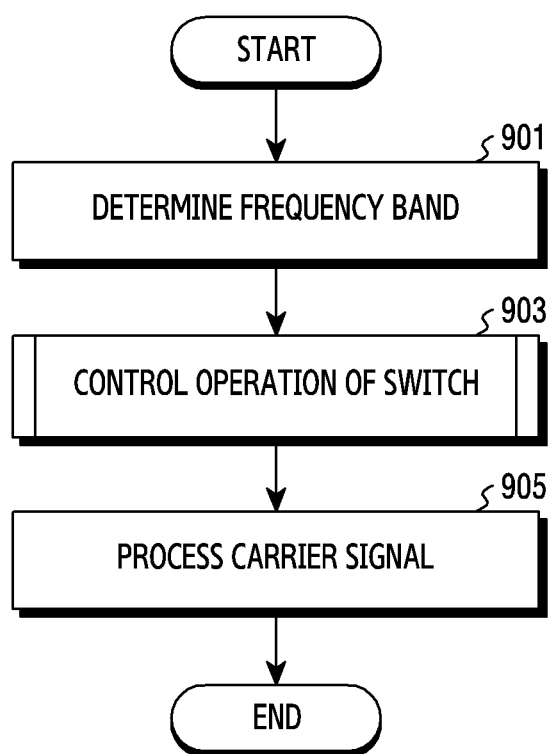
FIG. 9A is a flowchart illustrating a method of an electronic device for processing reception carrier signals using a switch according to an embodiment.

FIG. 9A is a flowchart illustrating a method of an electronic device for processing reception carrier signals using a switch according to an embodiment. The electronic device of FIG. 9A may be the electronic device 101 of FIG. 1.

Referring to FIG. 9A, the electronic device determines a frequency band of carriers in operation 901. For example, the processor 120 of the electronic device may determine a frequency band of downlink carriers based on the operation mode of the electronic device. The processor 120 may determine a frequency band of each of downlink carriers to be used for downlink communication of the electronic device.

In operation 903, the electronic device controls the operation of at least one switch connected to a plurality of communication circuits based on determined frequency bands and a specified condition. The specified condition may be a condition for frequency bands of downlink carriers to be used for the electronic device. The specified condition may be set based on at least one of the number of downlink carriers to be used by the electronic device and the number of carrier frequency bands that can be processed by each of the plurality of communication circuits (e.g., the Rx processing modules 222, 224, and 226).

The processor 120 of the electronic device may control the operation of at least one SPDT switch or at least one DPDT switch included on the switching unit 210 based on whether the frequency bands of the downlink carriers to be used for the electronic device satisfy the specified condition. For example, when the number of downlink carriers corresponding to a specified band among the downlink carriers to be used for the electronic device is greater than a specified number, the processor 120 of the electronic device may select a signal of at least one downlink carrier among the downlink carriers corresponding to the specified band and may control the operation of the at least one switch so that the selected signal of the at least one downlink carrier is provided to an Rx processing module configured to a signal in a different band among the plurality of Rx processing modules.

The specified number may be set based on the number of carriers that can be processed by one Rx processing module. For example, when the number of carriers that can be processed by one Rx processing module is two, the specified number may be two. When first, second, and third downlink carrier frequency bands correspond to a middle band and satisfy the specified condition, the processor 120 of the electronic device may control the switching operation of the at least one SPDT switch or the at least one DPDT switch included on the switching unit 210, thereby providing signals in the first and second carrier frequency bands to the second Rx processing module 224 configured to process a carrier signal in the middle band and providing a signal in the third carrier frequency band to the first Rx processing module 222 or the third Rx processing module 226, which is configured to process a carrier signal in a low band or a carrier signal in a high band but is capable of processing a carrier signal in the middle band.

In operation 905, the electronic device processes carrier signals through at least one communication circuit based on the switching operation. For example, when a signal of the downlink carriers is input to at least one of the Rx processing modules 222, 224, and 226 through the switching unit 210, the wireless communication module 192 of the electronic device may perform low-noise amplification and down-conversion of the signal of the downlink carriers using the at least one Rx processing module to which the signal of the downlink carriers is input. The processor 120 may control the operation mode of at least one local oscillator included in the local oscillator module 240 so that a reference frequency signal is provided to the at least one Rx processing module to which the signal of the downlink carriers is input among the plurality of Rx processing modules.

Figure 9B:
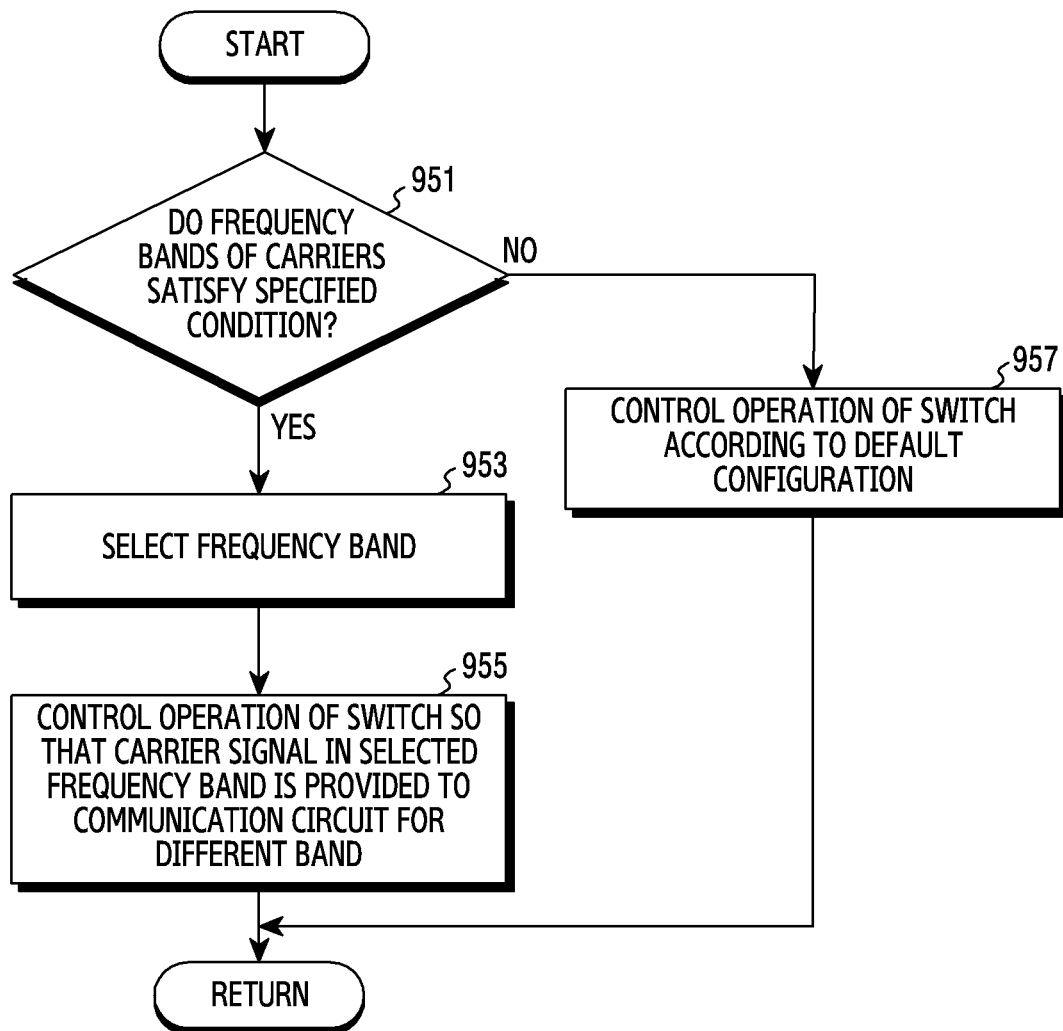
FIG. 9B is a flowchart illustrating a method of an electronic device for controlling a switch based on a frequency band of carriers according to an embodiment.

FIG. 9B is a flowchart illustrating a method of an electronic device for controlling a switch based on a frequency band of carriers according to an embodiment. Specifically, the operations illustrated in FIG. 9B describe operation 903 of FIG. 9A in more detail. The electronic device of FIG. 9B may be the electronic device 101 of FIG. 1.

Referring to FIG. 9B, the electronic device (e.g., the processor 120 of FIG. 1) determines whether determined frequency bands of a plurality of carriers satisfy a specified condition in operation 951. For example, the processor 120 may determine whether frequency bands of at least some of the plurality of carriers satisfy the specified condition. The specified condition may be set as described in operation 903 of FIG. 9A.

The specified condition may include a condition for a downlink carrier frequency band when the number of carrier frequency bands that can be processed by each of the Rx processing modules 222, 224, and 226 is less than the number of downlink carriers to be used for the electronic device. For example, when the number of carrier frequency bands that can be processed by each of the Rx processing modules 222, 224, and 226 is two and the number of downlink carriers to be used by the electronic device is three or more, a condition specified for the three or more downlink carriers may be set to L-L-L, M-M-M, and/or H-H-H.

As another example, when the number of carrier frequency bands that can be processed by each of the Rx processing modules 222, 224, and 226 is three and the number of downlink carriers to be used by the electronic device 101 is four or more, a condition specified for the four or more downlink carriers may be set to L-L-L-L, M-M-M-M, and/or H-H-H-H. L-L-L or L-L-L-L indicates that frequency bands of at least three or four downlink carriers among the downlink carriers to be used correspond to a low band. M-M-M or M-M-M-M indicates that frequency bands of at least three or four downlink carriers among the downlink carriers to be used correspond to a middle band. H-H-H or H-H-H-H indicates that frequency bands of at least three or four downlink carriers among the downlink carriers to be used correspond to a high band.

When the frequency bands of the plurality of carriers satisfy the specified condition, the electronic device selects at least one frequency band in operation 953. For example, when the frequency bands of at least some of the plurality of carriers satisfy the specified condition, the processor 120 may select at least one frequency band from among the frequency bands of at least some carriers satisfying the specified condition. When the frequency bands of downlink carriers to be used by the electronic device satisfy the specified condition, the processor 120 may select at least one of the frequency bands of the downlink carriers satisfying the specified condition. For example, when the frequency bands of first, second, and third downlink carriers to be used are Band 2, Band 3, and Band 4, which satisfy M-M-M, the processor 120 may select any one frequency band from among Band 2, Band 3, and Band 4, which correspond to a middle band. As another example, when the frequency bands of the first, second, and third downlink carriers to be used are Band 4, Band 38, and Band 40, which satisfy H-H-H, the processor 120 may select any one frequency band from among Band 38 and Band 40, which correspond to a high band.

The electronic device controls a switching operation so that a carrier signal in the selected frequency band is provided to a communication circuit for a different band (e.g., the Rx processing modules 222, 224, and 226) in operation 955. For example, the processor 120 may control the switching operation based on at least one of the number of carrier frequency bands that can be processed by each of the Rx processing modules 222, 224, and 226 and the type of low-noise amplifiers 501-1, 501-2, . . . , 501-N–1, and 501-N included in the respective the Rx processing modules 222, 224, and 226 so that a carrier signal in the selected frequency band is provided to a communication circuit for a different band. The type of the low-noise amplifiers 501-1, 501-2, . . . , 501-N–1, and 501-N may indicate a frequency band that a corresponding Rx processing module can process.

For example, when a frequency band of three downlink carriers to be used by the electronic device corresponds to M-M-M and the number of carrier frequency bands that can be processed by the second Rx processing module 224 configured to process a carrier signal in the middle band is two, the processor 120 may select one downlink carrier among the three downlink carriers and may control the switching operation of a switching unit so that a signal of the selected one downlink carrier is provided to the first Rx processing module 222 or the third Rx processing module 226 other than the second Rx processing module 224. When the frequency bands of first, second, and third downlink carriers to be used are Band 2, Band 3, and Band 4, which correspond to the middle band, and Band 4 is selected, the processor 120 may control the switching operation so that a carrier signal in Band 4 is provided to any one module capable of processing a signal in the middle band of the first Rx processing module 222, configured to process a signal in the low band, and the third Rx processing module 226, configured to process a signal in the high band, instead of the second Rx processing module 224 configured to process a signal in the middle band. The processor 120 may control the switching operation so that carrier signals in Band 2 and Band 3 are provided to the second Rx processing module 224 configured to process a signal in the middle band.

As another example, when a frequency band of three downlink carriers among five downlink carriers to be used by the electronic device 101 corresponds to H-H-H and the number of carrier frequency bands that can be processed by the third Rx processing module 226 configured to process a carrier signal in the high band is two, the processor 120 may select one downlink carrier among the three downlink carriers corresponding to the high band and may control the switching operation of the switching unit so that a signal of the selected one downlink carrier is provided to the first Rx processing module 222 other than the third Rx processing module 226. When the frequency bands of first, second, third, fourth, and fifth downlink carriers to be used are Band 2 and Band 3, which correspond to the middle band, and Band 38, Band 40, and Band 41, which correspond to the high band, and Band 41 is selected, the processor 120 may control the switching operation so that a carrier signal in Band 41 is provided to the first Rx processing module 222, which is configured to process a signal in the low band but is capable of processing a signal in the high band, instead of the third Rx processing module 224 configured to process a signal in the high band. The processor 120 may control the switching operation so that carrier signals in Band 2 and Band 3 are provided to the second Rx processing module 224 configured to process a signal in the middle band and carrier signals in Band 38 and Band 40 are provided to the third Rx processing module 226 configured to process a signal in the high band.

When the frequency bands of the plurality of carriers do not satisfy the specified condition, the electronic device controls the switching operation based on a default configuration in operation 957.

For example, when the frequency bands of downlink carriers to be used by the electronic device do not satisfy the specified condition, the processor 120 may control the switching operation of the switching unit according to a preset default value. When the frequency bands of at least three downlink carriers among the downlink carriers to be used do not satisfy L-L-L, M-M-M, or H-H-H, the switching unit 210 may provide a control signal to perform the switching operation according to the preset default value to the switching unit 210.

The processor 120 may control the switching unit 210 so that each of the downlink carriers to be used is provided to an Rx processing module configured to process a carrier signal of the corresponding frequency band. When the frequency bands of three downlink carriers to be used are Band 3 and Band 4 corresponding to the middle band and Band 38 corresponding to the high band (M-M-H), the processor 120 may control the switching unit 210 so that carrier signals in Band 3 and Band 4 are provided to the second Rx processing module 224 configured to process a carrier signal in the middle band and a carrier signal in Band 38 is provided to the third Rx processing module 226 configured to process a carrier signal in the high band.

Figure 10:
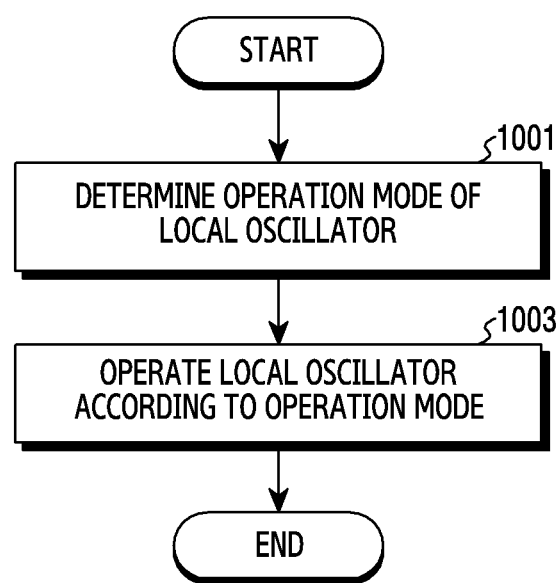
FIG. 10 is a flowchart illustrating a method of an electronic device for processing reception carrier signals by controlling transmission and reception modes of a local oscillator according to an embodiment.

FIG. 10 is a flowchart illustrating a method of an electronic device for processing reception carrier signals by controlling transmission and reception modes of a local oscillator according to an embodiment. The electronic device of FIG. 10 may be the electronic device 101 of FIG. 1.

Referring to FIG. 10, the electronic device determines the operation mode of at least one local oscillator 241, 242, and 243 based on at least one of the number of uplink carriers and the number of downlink carriers in operation 1001. For example, the processor 120 may determine at least one of the number of local oscillators to operate in the reception mode and the number of local oscillators to operate in the transmission mode based on at least one of the number of uplink carriers and the number of downlink carriers of the electronic device.

The processor 120 may determine the operation mode of at least one local oscillator 241, 242, or 243 included in a local oscillator module 240 based on at least one of the number of local oscillators to operate in the reception mode and the number of local oscillators to operate in the transmission mode. For example, the processor 120 may determine at least one local oscillator to operate in the transmission mode, to operate in the reception mode, or to operate alternately in the transmission mode and the reception mode.

For example, as illustrated in FIG. 7A, when a wireless communication module of an electronic device includes two Rx local oscillators 701 and 702, one Rx-Tx local oscillator 703, and one Tx local oscillator 704 and the electronic device uses one carrier for an uplink and three carriers for a downlink, the processor 120 may determine the one Rx-Tx local oscillator 703 to operate in the reception mode, allowing one local oscillator 704 to operate in the transmission mode and three local oscillators 701, 702, and 703 to operate in the reception mode.

As another example, as illustrated in FIG. 7A, when the wireless communication module of the electronic device includes two Rx local oscillators 701 and 702, one Rx-Tx local oscillator 703, and one Tx local oscillator 704 and the electronic device uses two carriers for the uplink and two carriers for the downlink, the processor 120 may determine the one Rx-Tx local oscillator 703 to operate in the transmission mode, allowing two local oscillators 703 and 704 to operate in the transmission mode and two local oscillators 701 and 702 to operate in the reception mode.

As another example, as illustrated in FIG. 7B, when a wireless communication module of an electronic device includes five Rx-Tx local oscillators 731, 732, 733, 734, and 735 and the electronic device uses two carriers for the uplink and three carriers for the downlink, the processor 120 may determine two Rx-Tx local oscillators 734 and 735 to operate in the transmission mode and three Rx-Tx local oscillators 731, 732, and 733 to operate in the reception mode, allowing two local oscillators 734 and 735 to operate in the transmission mode and three local oscillators 731, 732, and 733 to operate in the reception mode.

As another example, when the wireless communication module of the electronic device includes five Rx-Tx local oscillators 731, 732, 733, 734, and 735 and the electronic device uses three carriers for the uplink and three carriers for the downlink, the processor 120 may determine two Rx-Tx local oscillators 731 and 732 to operate regularly in the reception mode, two Rx-Tx local oscillators 734 and 735 to operate regularly in the transmission mode, and one Rx-Tx local oscillator 733 to operate alternately in the transmission mode and the reception mode based on the operation mode of the electronic device. For example, when the electronic device is in the reception mode, the processor 120 may determine the Rx-Tx local oscillator 733 to operate in the reception mode. When the electronic device transitions to the transmission mode, the processor 120 may determine the Rx-Tx local oscillator 733 to transition to operate in the transmission mode.

The foregoing examples are provided for illustrative purposes, and embodiments described herein are not limited thereto.

In operation 1003, the electronic device operates at least one local oscillator based on the determined operation mode of at least one local oscillator.

For example, the processor 120 may output a control signal for the operation mode to the local oscillator module 240 based on the determined operation mode of at least one local oscillator. The processor 120 may control at least one local oscillator, which is determined to operate in the transmission mode among the local oscillators 241, 242, and 243 included in the local oscillator module 240 of the wireless communication module 192, to provide a reference frequency signal to at least one upconversion mixer 401 included in the Tx module 230 of the wireless communication module 192.

The processor 120 may control at least one local oscillator, which is determined to operate in the reception mode among the local oscillators 241, 242, and 243 included in the local oscillator module 240 of the wireless communication module 192, to provide a reference frequency signal to at least one downconversion mixer 511-1, 511-2, . . . , and 511-M included in the Rx module 220 of the wireless communication module 192.

The processor 120 may control at least one local oscillator, which is determined to operate alternatively in the transmission mode and the reception mode among the local oscillators 241, 242, and 243 included in the local oscillator module 240 of the wireless communication module 192, to provide a reference frequency signal to at least one upconversion mixer 401 included in the Tx module 230 in the transmission mode of the electronic device 101 and to provide a reference frequency signal to at least one downconversion mixer 511-1, 511-2, . . . , and 511-M included in the Rx module 220 in the reception mode of the electronic device 101.

The operations illustrated in FIG. 10 may be performed while at least one of the operations in FIG. 8 or the operations in FIG. 9A is performed. For example, the processor 120 of the electronic device 101 may perform at least one of operation 1001 and operation 1003 in FIG. 10 while controlling the operation of at least one switch 212 in operation 903 in FIG. 9A.

The operations in FIG. 10 may be part of operation 905 in FIG. 9A. For example, the processor 120 of the electronic device 101 may perform at least one of operation 1001 and operation 1003 in FIG. 10 in order to process a reception carrier signal in operation 905 in FIG. 9A. The operations in FIG. 10 may also be performed separately from the operations in FIG. 8 and/or the operations in FIG. 9A.

According to an embodiment, an operating method of an electronic device may include determining frequency bands of a plurality of carriers to be used for communication; controlling the operation of at least one switch, connected to a plurality of communication circuits configured to process carrier signals in different frequency bands, based on the frequency bands of the plurality of carriers and a specified condition; and processing signals of the plurality of carriers using at least one communication circuit among the plurality of communication circuits based on the operation of the switch.

The controlling of the operation of the at least one switch based on the frequency bands of the plurality of carriers and the specified condition may include determining whether frequency bands of at least some carriers among the plurality of carriers satisfy the specified condition; selecting a first frequency band from among the frequency bands of the at least some carriers satisfying the specified condition when the frequency bands of the at least some carriers satisfy the specified condition; and controlling the operation of the at least one switch so that a carrier signal in the selected first frequency band is provided to a first communication circuit configured to process a carrier signal in a different frequency among the plurality of communication circuits and a carrier signal in a second frequency band among the frequency bands of the at least some carriers is provided to a second communication circuit configured to process the carrier signal in the second frequency band among the plurality of communication circuits.

The operating method may further include controlling the operation of the at least one switch so that a signal of each of the plurality of carriers is provided to a communication circuit configured to process a signal in a corresponding frequency band when the frequency bands of the at least some carriers do not satisfy the specified condition.

Each of the plurality of communication circuits may include at least one of a plurality of low-noise amplifiers and a plurality of downconversion mixers.

The specified condition may include a condition for a frequency band of at least some carriers among the plurality of carriers and may be set based on at least one of the number of the plurality of carriers and the number of carrier frequency bands processable by each of the plurality of communication circuits.

The operating method may further include determining the operation mode of a plurality of local oscillators based on at least one of the number of downlink carriers and the number of uplink carriers to be used for the communication; and providing a reference frequency signal to the at least one communication circuit among the plurality of communication circuits using at least one local oscillator determined to operate in a reception mode among the plurality of local oscillators.

The determining of the operation mode of the plurality of local oscillators may include determining the operation mode so that the at least one local oscillator alternately operates in a transmission mode and the reception mode based on the operation mode of the electronic device.

An electronic device according to an embodiment may dynamically control the transmission and reception modes of a local oscillator, thereby supporting CA using a smaller number of local oscillators than the number of carriers used for communication, achieving cost saving, and reducing complexity in design.

An electronic device according to an embodiment may switch a port for a signal in at least one carrier frequency band using a switch, thereby supporting inter-band non-contiguous CA in a low band, inter-band non-contiguous CA in a middle band, and inter-band non-contiguous CA in a high band, reducing complexity in design of an RF circuit and costs for producing the RF circuit. \An electronic device according to an embodiment may be one of various types of electronic devices, such as portable communication devices (e.g., smartphones), computer devices, portable multimedia devices, portable medical devices, cameras, wearable devices, or home appliances. However, the electronic devices are not limited to the above-described examples.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. Herein, a singular form of a noun corresponding to an item may include one or more of the things, unless the relevant context clearly indicates otherwise. Each of phrases such as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

Numerical terms such terms as "1st" and "2nd," or "first" and "second" may be used to distinguish a corresponding component from another component, and do not limit the components in other aspects (e.g., importance or order).

If an element (e.g., a first element) is referred to, with or without the term "operatively" or "communicatively", as "coupled with," "coupled to," "connected with," or "connected to" another element (e.g., a second element), the first element may be coupled with the second element, directly (e.g., wiredly), wirelessly, or via a third element.

Herein, the term "module" may include a unit implemented in hardware, software, or firmware, and may interchangeably be used with other terms, e.g., "logic," "logic block," "part," or "circuitry". A module may be a single integral component, or a minimum unit or part thereof, adapted to perform one or more functions. For example, a module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" means that the storage medium is a tangible device, and does not include a signal (e.g., an electromagnetic wave). However, this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described embodiments may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to certain embodiments thereof, it will be understood by those skilled in the art that various changes in form and details may be made therein without departing from the scope of the disclosure. Therefore, the scope of the disclosure should not be defined as being limited to the described embodiments, but should be defined by the appended claims and any equivalents thereof.

What is claimed is:

1. An electronic device, comprising:
   a first oscillator;
   a second oscillator;
   a third oscillator;
   a communication circuit electrically connected to the first oscillator, the second oscillator, and the third oscillator, and comprises:
      a first signal terminal for communication using a first carrier frequency band of a first frequency band,
      a second signal terminal for communication using a second carrier frequency band of the first frequency band,
      a third signal terminal for communication using a third carrier frequency band of the first frequency band,
      a fourth signal terminal for communication using a first carrier frequency band of a second frequency band,
      a fifth signal terminal for communication using a second carrier frequency band of the second frequency band, and
      a sixth signal terminal for communication using a third carrier frequency band of the second frequency band;
   a switch including:
      a first terminal,
      a second terminal electronically connected to the third signal terminal, and
      a third terminal electrically connected to the sixth terminal,
   wherein the switch selectively connects the first terminal to the second terminal or the third terminal;
   at least one antenna electrically connected to the first signal terminal, the second signal terminal, the fourth signal terminal, the fifth signal terminal, and the first terminal; and
   a control circuit,
   wherein, when communication with an external electronic device is to be performed using two or less carrier frequency bands in one of the first frequency band and the second frequency band, the control circuit is configured to communicate with the external electronic device using the first carrier frequency band or the second carrier frequency band of the one frequency band, and
   wherein, when communication with the external electronic device is to be performed using three or more carrier frequency bands in one of the first frequency band and the second frequency band, the control circuit is further configured to:
      connect the first terminal to the second terminal or the third terminal using the switch, and
      communicate with the external electronic device using the first carrier frequency band, the second carrier frequency band, and the third carrier frequency band of the one frequency band.

2. The electronic device of claim 1, wherein the control circuit is further configured to:
   when communication with the external electronic device is to be performed using three or more carrier frequency bands corresponding to the first frequency band, connect the first terminal with the third terminal using the switch so that at least one carrier frequency band among the three or more carrier frequency bands corresponding to the first frequency band is provided to the sixth signal terminal, and
   when communication with the external electronic device is to be performed using three or more carrier frequency bands corresponding to the second frequency band, connect the first terminal with the second terminal using the switch so that at least one carrier frequency band among the three or more carrier frequency bands corresponding to the second frequency band is provided to the third signal terminal.

3. The electronic device of claim 1, wherein the switch comprises a single pole double throw (SPDT) switch or a double pole double throw (DPDT) switch.

4. The electronic device of claim 1, wherein the communication circuit further comprises:
   a first reception circuit configured to receive a signal in at least one carrier frequency band through at least one of the first signal terminal, the second signal terminal, or the third signal terminal; and
   a second reception circuit configured to receive a signal in at least one carrier frequency band through at least one of the fourth signal terminal, the fifth signal terminal, or the sixth signal terminal, and
   wherein each of the first reception circuit and the second reception circuit comprises at least one of a plurality of low-noise amplifiers or a plurality of down-conversion mixers.

5. The electronic device of claim 4, wherein the control circuit is further configured to control at least one of the first oscillator, the second oscillator, or the third oscillator so that a reference frequency signal is provided to at least one of the first reception circuit or the second reception circuit.

6. The electronic device of claim 1, wherein the control circuit is further configured to control an operation of at least one of the first oscillator, the second oscillator, or the third oscillator based on at least one of a number of carriers used for downlink communication and a number of carriers used for uplink communication.

* * * * *